(12) United States Patent
Calhoun, Jr. et al.

(10) Patent No.: US 7,742,930 B1
(45) Date of Patent: Jun. 22, 2010

(54) WEB-BASED MANAGED CARE SYSTEM HAVING A COMMON ADMINISTRATIVE ACCOUNT

(75) Inventors: John C. Calhoun, Jr., Holliston, MA (US); Mark P. McCormick, Washington Crossing, PA (US); Michael D. Abbott, Northwood, NH (US); Paul J. Grous, Concord, MA (US)

(73) Assignee: Perot Systems Corporation, Plano, TX (US)

( * ) Notice: Subject to any disclaimer, the term of this patent is extended or adjusted under 35 U.S.C. 154(b) by 790 days.

(21) Appl. No.: 09/611,165

(22) Filed: Jul. 6, 2000

(51) Int. Cl.
*G06Q 10/00* (2006.01)

(52) U.S. Cl. .................. 705/2; 705/4; 705/30; 705/35; 705/36; 707/104

(58) Field of Classification Search .................. 705/2, 705/3, 4, 30, 36; 709/229; 707/4
See application file for complete search history.

(56) References Cited

U.S. PATENT DOCUMENTS

| | | | | |
|---|---|---|---|---|
| 4,648,037 | A * | 3/1987 | Valentino | 705/36 R |
| 5,305,347 | A * | 4/1994 | Roschmann et al. | 375/150 |
| 5,832,447 | A * | 11/1998 | Rieker et al. | 705/2 |
| 5,890,129 | A | 3/1999 | Spurgeon | 705/4 |
| 5,918,208 | A | 6/1999 | Javitt | 705/2 |
| 5,930,759 | A | 7/1999 | Moore et al. | 705/2 |
| 6,067,522 | A * | 5/2000 | Warady et al. | 705/2 |
| 6,182,142 | B1 * | 1/2001 | Win et al. | 709/229 |
| 6,263,330 | B1 * | 7/2001 | Bessette | 707/4 |
| 6,401,079 | B1 * | 6/2002 | Kahn et al. | 705/30 |
| 6,601,020 | B1 * | 7/2003 | Myers | 702/186 |
| 6,654,786 | B1 * | 11/2003 | Fox et al. | 709/203 |
| 7,305,347 | B1 * | 12/2007 | Joao | 705/1 |
| 2002/0026332 | A1 * | 2/2002 | Snowden et al. | 705/3 |
| 2002/0077849 | A1 * | 6/2002 | Baruch et al. | 705/2 |

OTHER PUBLICATIONS

It's time to adopt Internet technology Nursing Economics; Pitman; Nov./Dec. 1998; Billie Heister Waldo ; vol. 16; pp. 1-6.*

* cited by examiner

*Primary Examiner*—Vanel Frenel
(74) *Attorney, Agent, or Firm*—Winstead PC

(57) ABSTRACT

A web-based system for collecting and managing administrative details of a member in a managed care organization. The system collects and makes available over the Internet to all concerned parties digital information that can be selectively retrieved, viewed and managed by all authorized participants. This information, for example, includes the personal demographic details concerning the member and their eligible dependents, their plan elections and preferences, and their benefits usage history. The aggregated information is stored in a central database, using a "member account" paradigm. The member supplies the base information for the member account at initial enrollment in a health plan, either directly through the Internet or through an interface to their employer's human resources data system. Such information is then available to be shared via the Internet with a health provider, new employer or health insurance plan, or for the member themselves. Historical information about expenditures, usage, payments, and the like, can then be added to the record as experienced, allowing a greater ability to derive value from the contained information.

19 Claims, 16 Drawing Sheets

WEB-BASED MANAGED CARE SYSTEM HAVING A COMMON ADMINISTRATIVE ACCOUNT

BACKGROUND OF THE INVENTION

1. Technical Field

The present invention relates generally to a system for providing web-based data collection and management in a managed care organization.

2. Description of the Related Art

The business processes currently in place in almost all managed care organizations (MCO) are needlessly complex and inefficient, requiring a great deal of manual labor and resultant expense. FIG. 1 shows a simple example illustrating such inefficiencies. This drawing illustrates how the key constituents (members 100, employers 102 and providers 104) now carry out the simple task of making an inquiry to the MCO. As illustrated, the MCO typically provides or uses a member services call center 106, an account service call center 108, and a provider service call center 110. Data queries generated from the member services call center 106 are processed by a member services database 107, while data queries generated from account services and provider services are processed by the account service database 109 and provider service database 111. When a member 100, an employer 102 or a provider 104 desires to make an inquiry, he or she typically accesses the MCO via a telephone 115, and requested information 117 is usually returned by mail 118. Another example of the inefficiencies inherent in the current system is shown in FIG. 2, which illustrates how an employee 200 enrolls in his or her employer's managed care program. In this example, the employee 200 fills out enrollment forms 202, which are then forwarded on to the employer's HR department 204. The HR department 204 enters such data into the employer's information system 206 and then forwards the information via regular mail to the managed care organization 208. The MCO then has to enter the data in its information system 210. Such processes are time consuming and inefficient.

In addition to the structural and administrative problems inherent in the existing MCO industry, several major trends are now emerging in the health care industry as a whole. Employers are taking a less active role in the payment of and administration of health care benefits. The use of global, interconnected computer systems, such as the Internet, have become commonplace and inexpensive. Moreover, new standards, systems and processes for the health care industry infrastructure have begun to be proposed and implemented. Finally, there has been significantly increased demand by consumers for health-related information. Indeed, consumers are becoming more educated and participatory in clinical decision making and are demanding more from physicians.

The Internet has been a major catalyst for change. It is estimated that there are now over 65 million U.S. adults with access to the Internet, which represents over 25% of the population. The Internet is rapidly becoming the most important communications channel for health plans, and many companies have begun to provide health care-related services online. Healtheon Corporation provides software and services that enable healthcare information, both medical and administrative, to be exchanged over the Internet. The company provides a system to automate such tasks as HMO enrollment, referrals, data retrieval, and claims processing for use by insurers, doctors, pharmacies, and consumers. Healtheon, through WebMD, also provides Internet-based technology that connects physicians, hospitals, payors, and consumers to an array of interactive tools and services. Other companies are deploying solutions as application services. Alteer, for example, is an application service provider (ASP) that provides a web-based workflow solution to address administrative and communication needs of healthcare professionals and consumers. Alteer establishes healthcare professionals' practices as online healthcare portals. As a result, patients can visit the respective physician web sites and search for information specific to their physician's expertise and their personal needs. Other companies now provide online solutions for managing patient information access, contract compliance and billing, and clinical performance analysis. Still others provide online solutions that allow physicians to manage their clinical information and secure access to the same information by patients so that patients can actively participate in their personal family health management.

Currently, every constituent of the health care system collects a set of data that is likely to be somewhat different from one party to another. This is manifested in a health care record that is collectively strewn across the health care landscape in various multiple enterprises. The present effort of collecting each element of the data requires that the data set be as small as possible, containing only essential information. The ability to share information, such as submitting a claim to a managed care organization or authorizing a visit to a specialist, is difficult because no party can ensure that they are matching records on the same individual.

It would be desirable to be able to leverage the Internet to allow loosely-related parties to share a common set of data, with one common identification number, allowing what was previously disparate data to become meaningful, actionable information.

BRIEF SUMMARY OF THE INVENTION

The present invention is a web-based system for collecting and managing administrative details of a member in a managed care organization. The system collects and makes available over the Internet to all concerned parties digital information that can be selectively retrieved, viewed and managed by all authorized participants. This information, for example, includes the personal demographic details concerning the member and their eligible dependents, their plan elections and preferences, and their benefits usage history. The aggregated information is stored in a central database, using a "member account" paradigm. The member supplies the base information for the member account at initial enrollment in a health plan, either directly through the Internet or through an interface to their employer's human resources data system. Such information is then available to be shared via the Internet with a health provider, new employer or health insurance plan, or for the member themselves. Historical information about expenditures, usage, payments, and the like, can then be added to the record as experienced, allowing a greater ability to derive value from the contained information.

The data set which results from the present invention substantially reduces the amount of manual record-keeping that is required for each participant, while increasing data accuracy. The invention dramatically lowers administrative costs for every user of the system. In addition, data captured in the system is richer than that which is currently owned by any one party, enabling new forms of value through reporting and data extraction. The invention allows the user (whether member/patient/employee) to access their personal healthcare administrative record and use that information to increase their control over their healthcare experience. The account is portable, meaning that it will support a member's move to other employers or other health plans.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Familiarity with the MCO business model is presumed in the following discussion. As is well-known, a member is a subscriber or a subscriber's dependent if the MCO accepts risk. A subscriber is an employee who is eligible and elects coverage. An employer identifies the employer entity, typically a corporation that has a contract with a health organization to provide services to its employees. The MCO is the managed care organization entity. This is the healthcare organization that is contracting with an employer entity to provide service to the employer's employees.

In an illustrated embodiment, a web-based transaction server is operated at a web site accessible over the Internet. In addition, the managed care organization (MCO) may operate a web-based transaction server (sometimes referred to herein as the MCO server or site). Typically, a user (either a member, employer, or provider) will navigate first to the MCO server and then be redirected to the transaction server, although this is not required. This configuration, of course, is merely exemplary and should not be taken to limit the present invention.

Generalizing, the invention may be practiced in any convenient server or set of servers accessible over a computer network from a client machine having a web browser or other graphics viewer. Preferably, an available resource (a document, page, object or the like) is identified by a Uniform Resource Locator (URL) that can be accessed by an authenticated user. The computer network may be the Internet, an intranet, a virtual private network, or the like. Generalizing, a server used in the present invention may be a Web Application Server (WAS), a server application, a servlet process or the like. Through the standard Hypertext Transfer Protocol (HTTP), a client browser accesses the HTTP-enabled server to obtain access to the resource. As is well-known, most browsers provide security through the Transport Layer Security (TLS) protocol. This protocol allows both the browser and the WAS to authenticate each other (i.e. to prove their identity to each other), and it also provides data protection (data integrity and data confidentiality) for data in transit between them. The strongest form of authentication provided by the TLS/SSL protocol is client- and server-side certificate authentication. Such authentication requires the client (the browser) and the server (the WAS) to each have a private/public cryptographic key pair, and associated certificates. Public key authentication maintains a binding between a user's identity and a public key that can only be unlocked by the associated private key. In an illustrative embodiment of the present invention, a client browser and a WAS implement these protocols to provide mutual authentication. Thus, the invention provides secure web-based access to protected member data which, as described below, is maintained within a novel administrative account structure.

Figure 1:
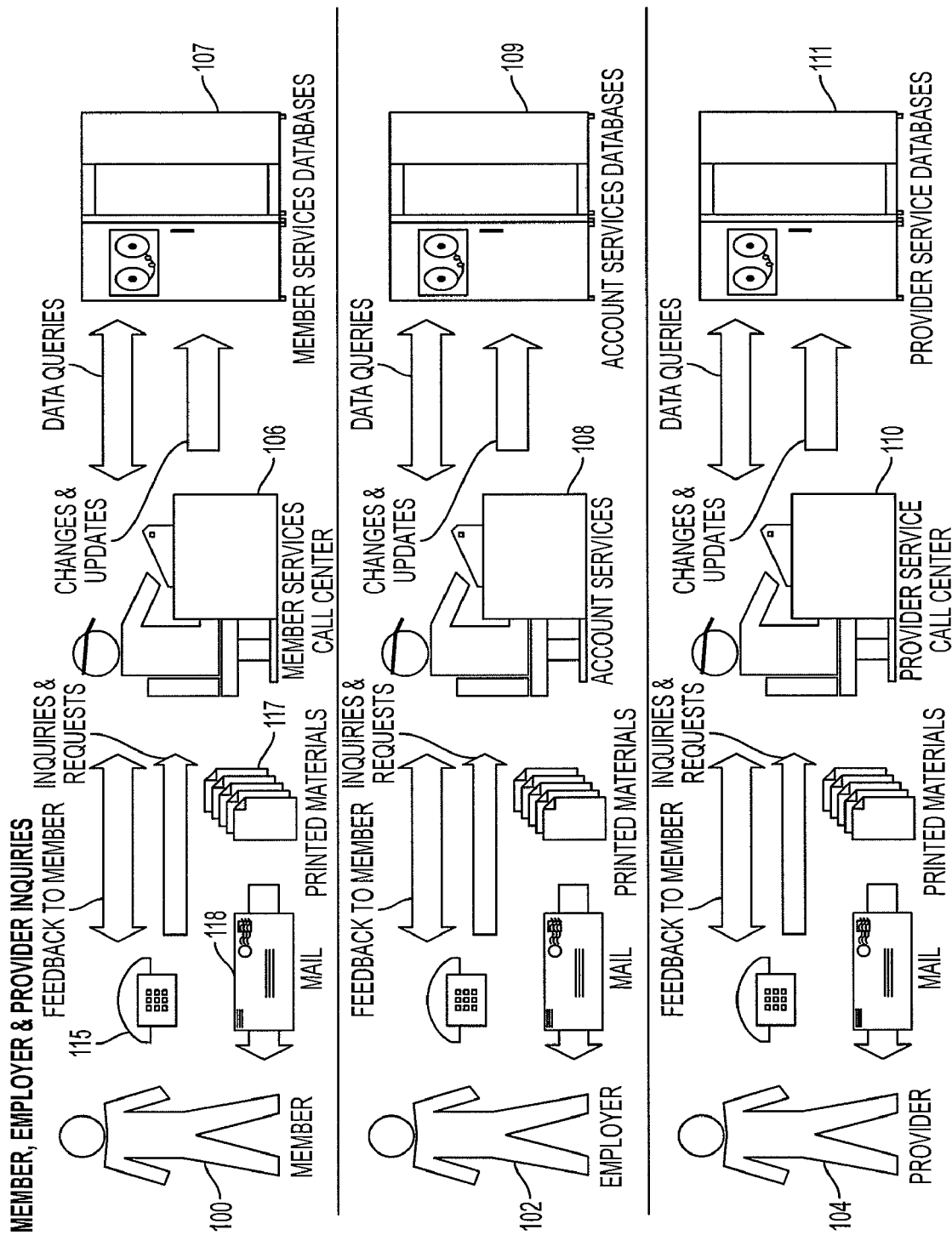
FIG. 1 illustrates how members, employers and providers obtain inquiries from existing MCO online systems.
Figure 2:
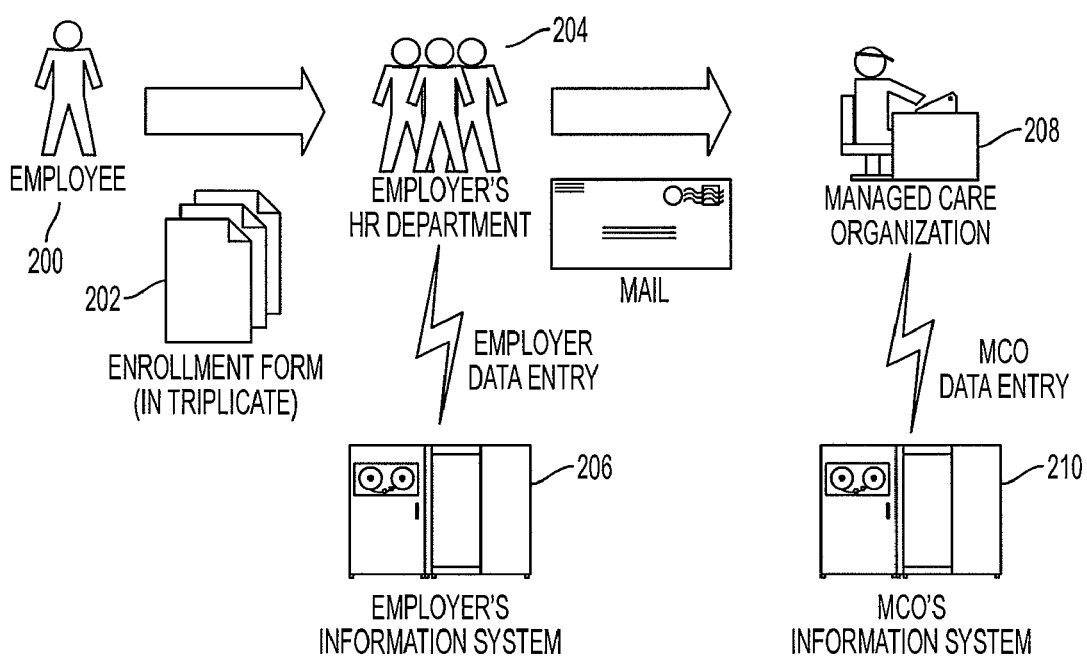
FIG. 2 illustrates a conventional MCO enrollment process.
Figure 3:
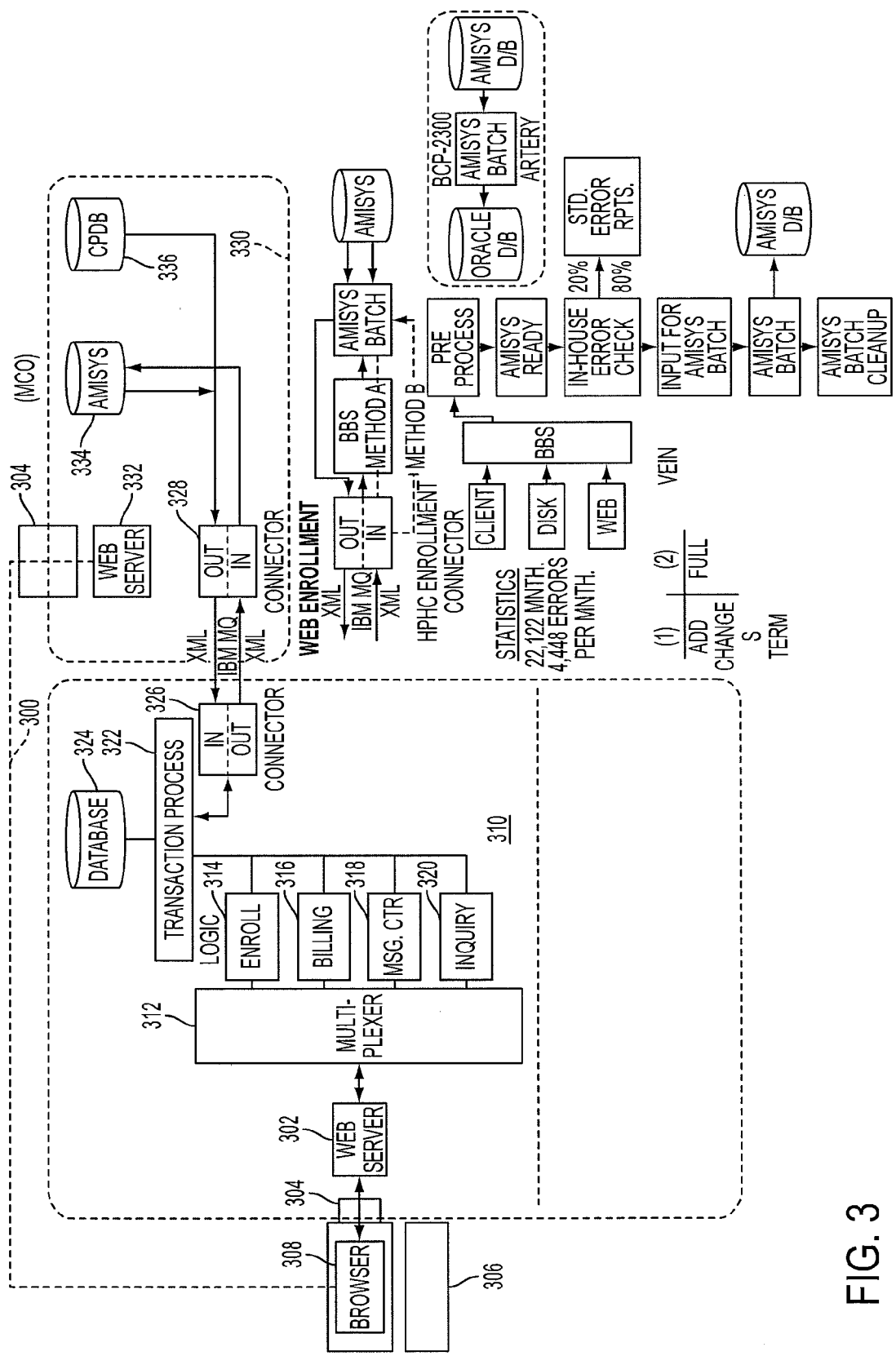
FIG. 3 illustrates a web-based managed care system having a common administrative account according to the present invention.

FIG. 3 illustrates the web-based managed care system 300 having a common administrative account according to the present invention. Users of the system include members, employers, and others. The system 300 comprises a web server 302 to which users connect over a computer network 304 in a conventional manner using a client machine 306 having a web browser 308. As noted above, the network 304 is the public Internet, a corporate intranet, a private virtual network, a web content delivery service, or the like. The web server is identified by a publicly-available second level domain name. The system 300 includes a web-based subsystem 310 comprising multiplexer 312, and a set of functional modules including enrollment 314, billing 316, messaging 318, and inquiry 320. Each module interfaces to a transaction processor 322 and a database 324. The transaction subsystem interfaces to the managed care organization (MCO) subsystem 330 through a set of common XML-based interfaces 326 and 328. The MCO subsystem 330 is accessible through an MCO server 332 and includes a transaction processor 334 and a backend database 336.

Each of the functional modules is accessible via a web browser. Collectively, these modules comprise an administrative toolset that leverages off-the-shelf technology to fundamentally change how these administrative processes are carried out in a managed care organization. In an illustrative embodiment, the enrollment module 314 enables members, employers and providers to enroll, re-enroll, and to view enrollment information. More specifically, the enrollment module provides the following major functions: group account setup, eligible employee roster upload, member enrollment and changes, employer validation, notification, reporting, online help, and temporary ID card provisioning.

The billing module 316 enables online billing and payment, and facilitates claims matching. By leveraging the information about who is enrolled through the use of a roster which is shared between the employer and the plan, a great deal of manual work can be eliminated. Currently, each party must reconcile their rosters to the other's manually. The billing module allows the importation of a roster file from either party, and execution of a "compare roster" function within the module reports on any differences between the two. The shared roster leads to more accurate bills. In particular, the bill is presented via the secure messaging module 318, eliminating time and postal waste. The bill, which is preferably presented via XML, includes "drill down" capability for detail inquiries, and an Electronic Funds Transfer component to facilitate immediate payment.

The messaging module 318 provides secure messaging among the various parties to enable referrals, authorizations, reporting and the like. The use of electronic communication by non-secure means such as standard e-mail is rising, and Health Insurance Portability and Accountability Act of 1996 (HIPAA) guidelines will require a more robust solution. The messaging module allows users to communicate with other selected parties in their personal healthcare network, such as a patient to their Primary Care Physician, a PCP referring to a specialist, or from any constituent to the MCO. The recipient is notified that a secure communication is waiting to be read on the host server, and only after a secure sign-on process (where the user is identified) can he or she read that information. The message preferably is never exposed to non-secured channels.

The inquiry module 320 provides a mechanism for provider database lookup, viewing of enrollment information, and the like. This module provides a solution to one of the biggest sources of constituent frustration in the healthcare industry—the ability to easily get answers to questions. The inquiry module provides a self-service solution for the user to find the answers they need to the most common types of questions: Claims Status, Eligibility and Benefits Inquiry, Provider Network information, and access to FAQ documents that are custom tailored by the application for that particular user. In a preferred implementation, each module uses Common Gateway Interface (CGI) fill-in forms or active server pages (.asp) to obtain data that is managed by the system, as will be seen.

Figure 4A:
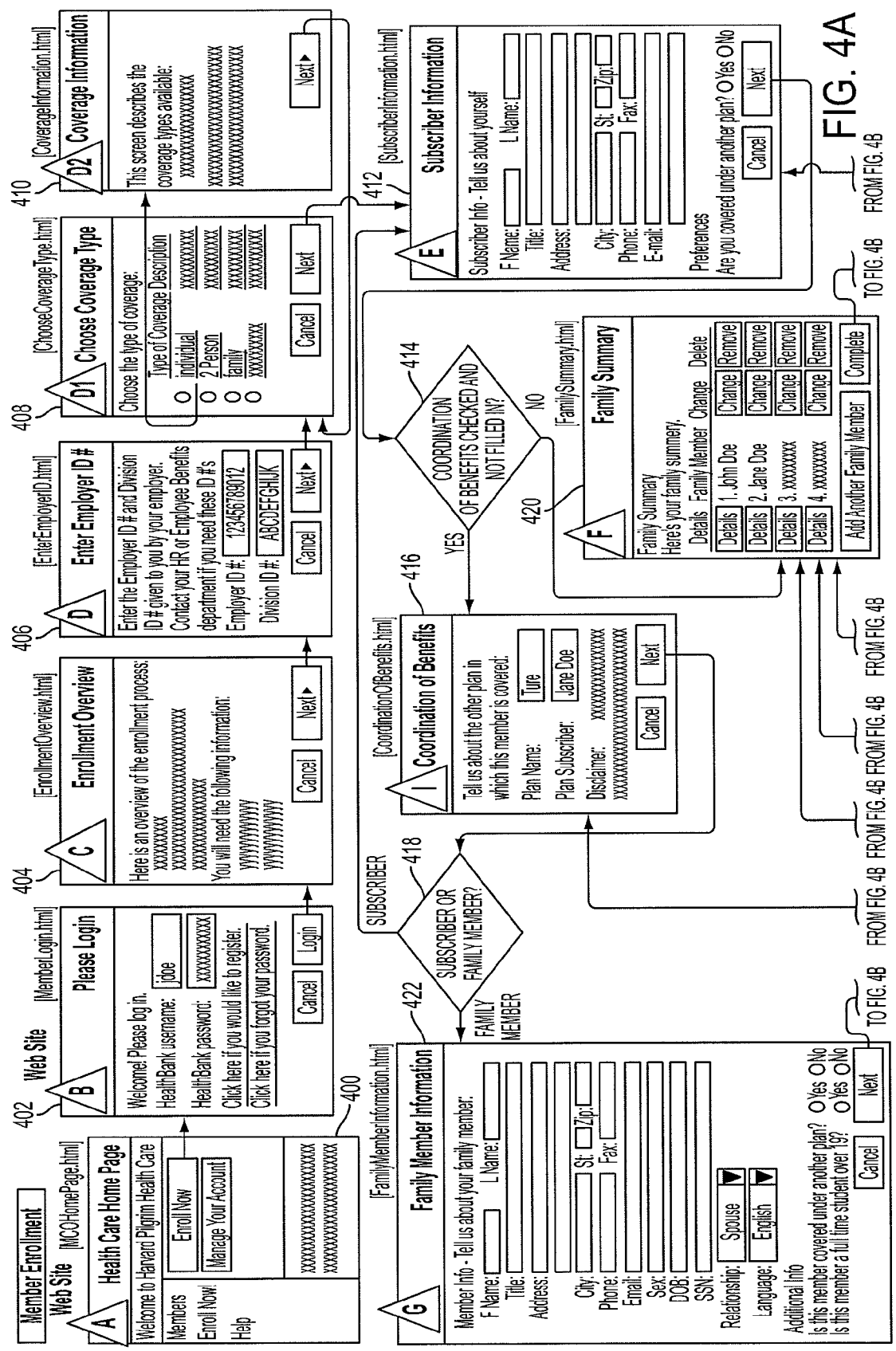
FIGS. 4A-4B illustrate representative screen displays and process flow for a member enrollment function in the web-based managed care system of the invention.
Figure 4B:
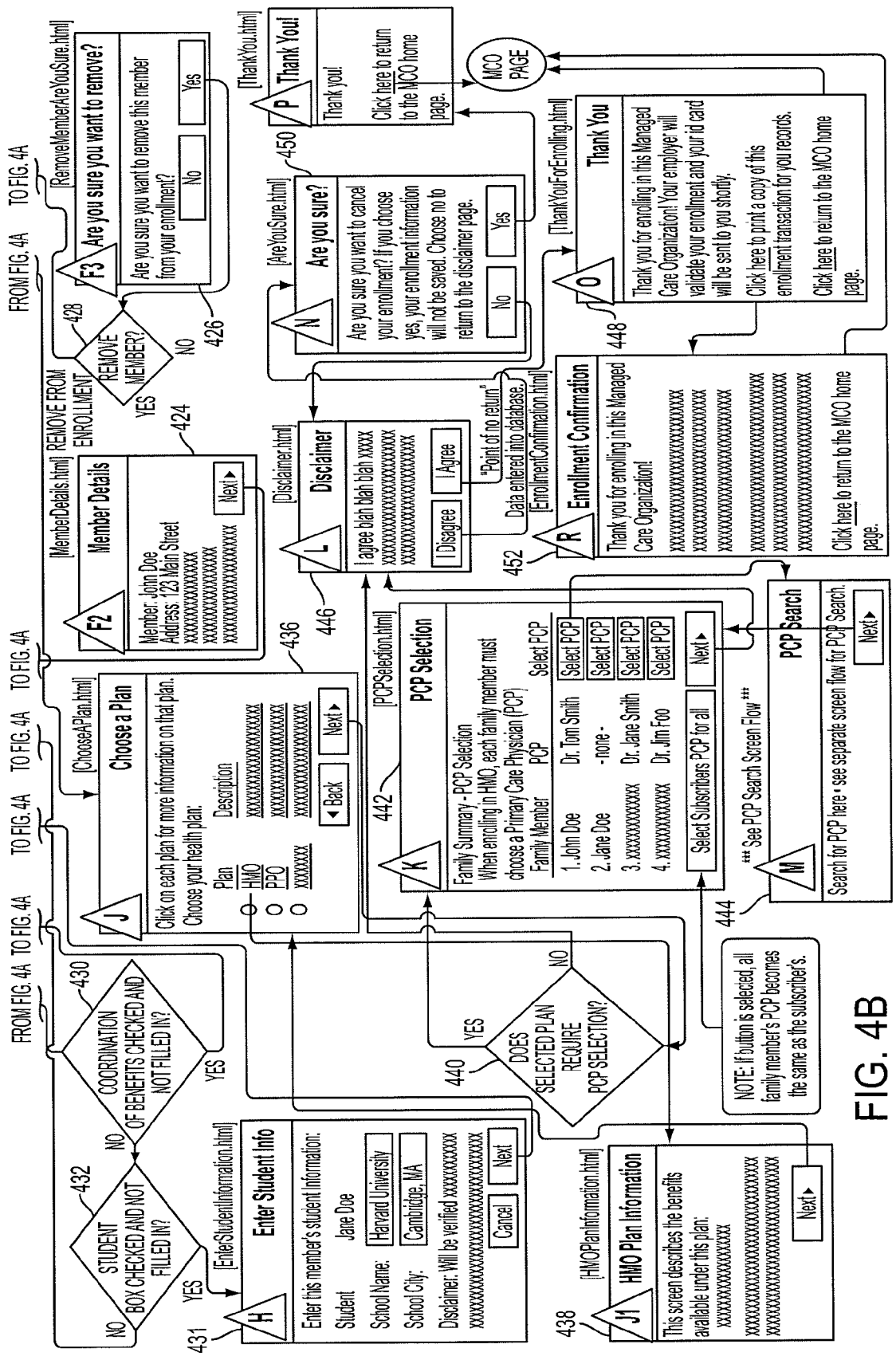

FIGS. 4A-4B illustrate the representative screen displays and process flow for a typical member enrollment. This functionality is provided by the administrative toolset and, in particular, by the enrollment module 314. The process begins when the user navigates to the MCO home page 400 hosted on web server 332. When the user selects the Enroll Now link, the user is redirected to the enrollment page 402 hosted on web server 302. To enroll, the user selects the login link, which opens the browser to an enrollment overview page 404 describing an overview of the enrollment process and the information that the user will need to provide to complete the enrollment process. Upon selection of the Next link, the browser opens up an Employer ID# page 406. This page requires entry of an Employer ID and Division ID provided to the user by the employer. Upon entry of this information, the user selects the Next link, which opens a Choose Coverage Type page 408. This page identifies the possible coverage types (e.g., individual, 2 person, family, or the like) that are available from the MCO. Each coverage type is a hypertext link. Selection of one of the links (in the case, the Individual link) opens the browser to Coverage Information page 410, which describes the relevant coverage. When the user selects the Next button, the browser returns to the Choose Coverage Type page 408.

If the user selects the Next button from the Choose Coverage page 408, the browser opens a Subscriber Information page 412, which includes a fill-in form requesting personal details about the subscriber including, for example, name, title, address, telephone, fax, email, etc. The form also requests the user to identify whether he or she is covered under another health plan. If so, the plan benefits will need to be coordinated if they are not already. Thus, once the form is filled-in and the user selects the Next button, a test 414 is executed to determine whether the user is covered by another plan but the system has not coordinated benefits. If the outcome of the test at step 414 is positive, the browser opens up a Coordination of Benefits page 416, which requests the user to identify his or her other plan by name and plan subscriber. The user then selects the Next button, which executes a test at step 418 to determine whether the plan subscriber is a subscriber to the MCO plan or, alternatively, a family member. If the outcome of the test at step 418 indicates that the plan subscriber is the subscriber, the browser navigates back to the Subscriber Information page 412. If, however, the test at step 418 indicates that the plan subscriber is a family member, the browser is directed to a Family Member Information page 422 as will be described below.

If the outcome of the test at step 414 is negative, however, the user is navigated to a Family Summary page 420. This page lists each member of the MCO subscriber's family. By selecting a Details button next to each name, the user can navigate to a Member Details page 424 and then return back to the Family Summary page 420. By selecting a Change Button in page 420, the user is navigated back to the Subscriber Information page 412. By selecting a Remove Button in page 420, the browser opens up a pop-up window 426 requesting confirmation. A test 428 is then run to determine whether a person is to be removed. If so, the browser returns to the Family Summary page 420 with the selected person removed. If, however, the outcome of the test at step 428 is negative, the browser returns to the Family Summary page 420 without change.

The user may select the Add Another Family Member button in page 420, which opens the browser to the Family Member Information page 422. This page requests relevant information such as name, title, address, telephone, fax, email, DOB, SSN, relationship, primary language, and the like. As noted above, this page is also reached from the test at step 418. The Family Member Information page also questions whether the member is covered under another plan and if the member is a full-time student over 18. When the user selects the Next button on page 422, a test is run at step 430 to determine whether the coordination of benefits box was checked and not filled in. If so, the browser returns the Coordination of Benefits page 416, which has been previously described. If, however, the outcome of the test at step 430 is negative, a test is executed at step 432 to determine if the student button was selected and not filled in. If not, the browser returns to the Family Summary page 420. If, however, the outcome of the test at step 432 is positive, the browser navigates to the Enter Student Info page 434 so that data (e.g. school name, city, etc.) can be collected. From Enter Student Info page 434, selection of the Next button returns the browser to the Family Summary page 420.

When the user selects the Complete button on the Family Summary page 420, the browser returns a Choose a Plan page 436. This page identifies specific plan types (e.g., HMO, PPO, or the like), each of which is identified by a hypertext link.

When the user selects a plan link, the browser opens up the appropriate description page, in this case the HMO Plan Information page 438. If the user selects the Next button from the Choose a Plan page 436, a test is performed at step 440 to determine whether the selected plan requires a Primary Care Physician (PCP) selection. If so, the browser navigates to PCP Selection page 442. This page enables each family member to select a given PCP or, using a Select All button, to force each family member's PCP to be the same as the subscribers. If the Select PCP button is selected, the browser navigates to a PCP search page 444, which is described in more detail below. When the user selects the Next button from the PCP Selection page 442, or upon a negative outcome of the test at step 440, the browser opens a Disclaimer page 446 setting forth the legal terms and conditions for enrollment. If the user selects the "I Agree" button, the browser navigates to a Thank You page 448. If the user selects the "I Disagree" button, the browser navigates to an Are you sure page 450 requesting whether the user desires to cancel enrollment. From the Thank you page 448, the user can print an Enrollment Confirmation page 452 or return to the MCO home page. This completes the enrollment process.

Figure 5:
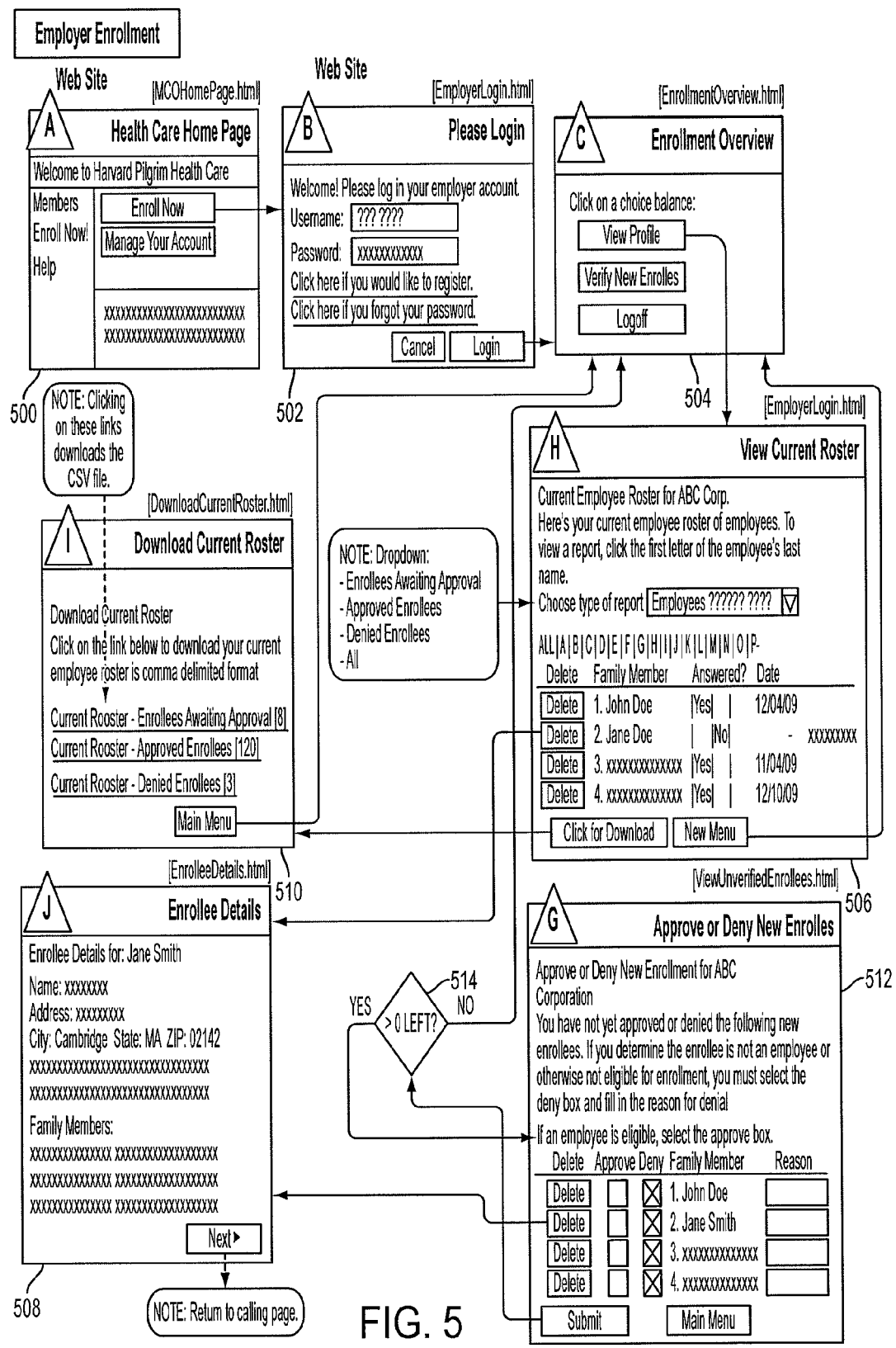
FIG. 5 illustrative representative screen displays and process flow for an employer enrollment function in the inventive system.

FIG. 5 illustrates a representative employer enrollment process. In this case, the user navigates to the MCO home page 500 and selects the Enroll Now button. This navigates the user's browser to the system employer login page 502. By selecting the Login button, the user navigates to the Employer Main Menu page 504. Selection of the View Roster button returns a View Current Roster page 506, which identifies the current employees of the company. By selecting a Details button next to each name, the browser navigates to an Enrollee Details page 508, which identifies the employee and his or her family member data. By selecting a Click to Download button on page 506, the browser returns a Download Current Roster page 510, which includes appropriate roster links as shown. From the Verify New Enrollee button in page 504, the browser navigates to an Approve or Deny New Enrollee page 512. From that page, the user can verify that an identified enrollee is eligible for the plan by highlighting an entry and selecting the Submit button. After all entries are checked, as determined by a positive outcome of the test at step 514, control routines the browser to the Employer Main Menu page 504. The user can then logoff or perform other tasks.

Figure 6:
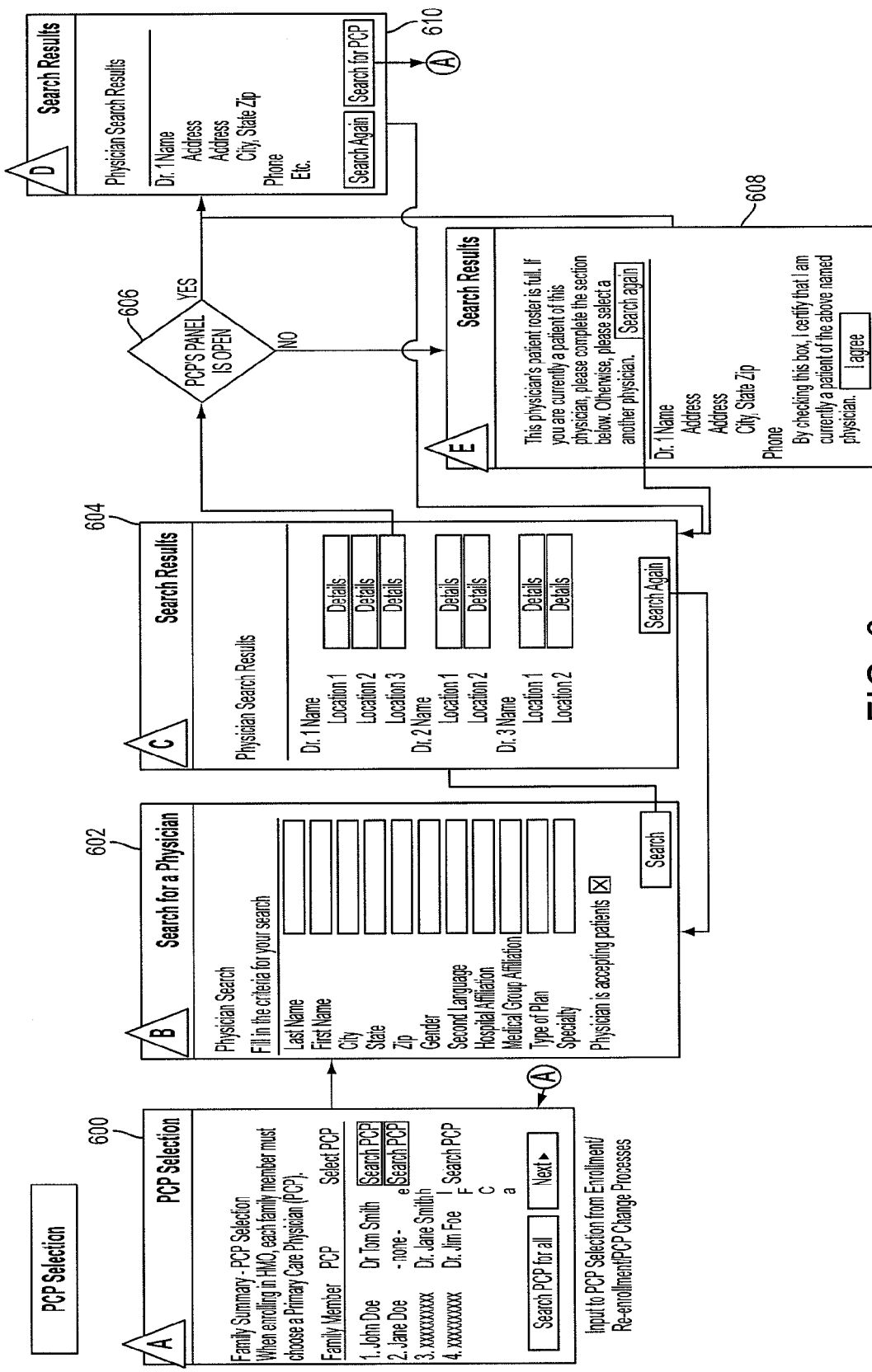
FIG. 6 illustrates representative screen displays and process flow for a Primary Care Physician (PCP) selection function according to the invention.

FIG. 6 illustrates a representative PCP Selection process, which can occur from enrollment, re-enrollment or PCP Change processes. From the PCP Selection page 600, the user navigates to the Search for a Physician page 602. The user can fill in parameters such as name, address, gender, language, hospital affiliation, medical group affiliation, type of plan, specialty, and the like. After selecting the Submit button, the search engine returns a Search Results page 604, which identifies one or more matching selections based on the search criteria. A test is then performed at step 606 to determine whether the PCP's Panel is open for additional patients. If not, a Search Results page 608 is returned to the user indicating that the physician cannot accept additional patients and requesting selection of another physician. If the outcome of the test at step 606 is positive, however, the Search Results page 610 is returned identifying the particular physician.

Figure 7:
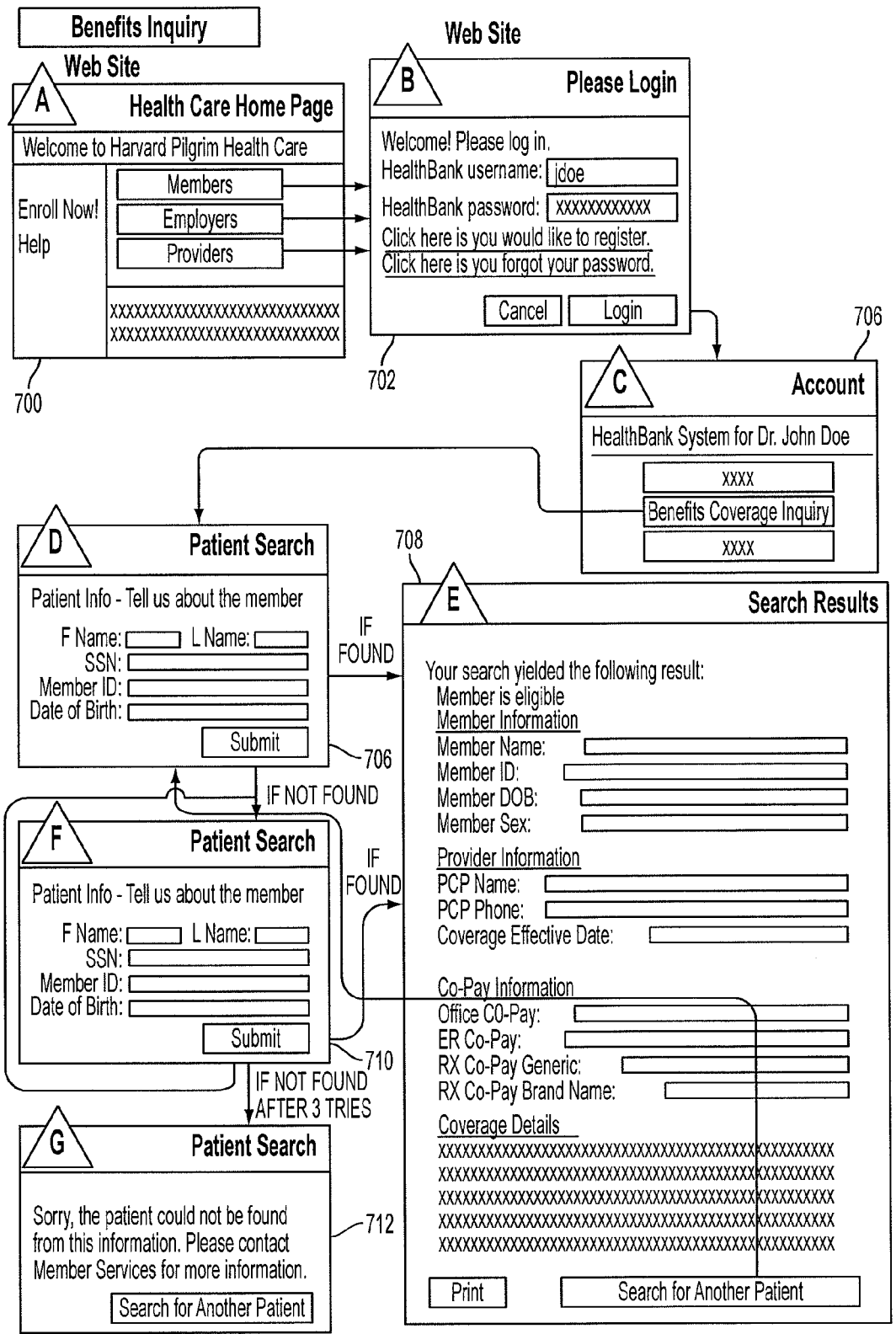
FIG. 7 illustrates representative screen displays and process flow for a benefits inquiry according to the invention.

FIG. 7 illustrates a representative operation of the benefits inquiry module. The routine begins when the user navigates to the MCO home page 700. A user can select the Members button, the Employers button or the Providers button. Depending on the button selected, the user is navigated to the appropriate login page 702 of the system. Upon selection of the Login button, an Account page 704 is returned to the browser. Selection of a Benefits Coverage Inquiry button returns a Patient Search page 706. Following entry of the requested information and selection of the Submit button, a Search Results page 708 is returned if the member is found. This page identifies the member, the provider, co-pay information and other coverage details. If the member cannot be found, another Patient Search page 710 is returned. If the member cannot be located after a given number of attempts, a Patient Search page 712 is returned indicating that the patient could not be located given the search criteria entered. This completes the benefits inquiry process. A similar functionality is provided to inquire about a given provider.

Figure 8:
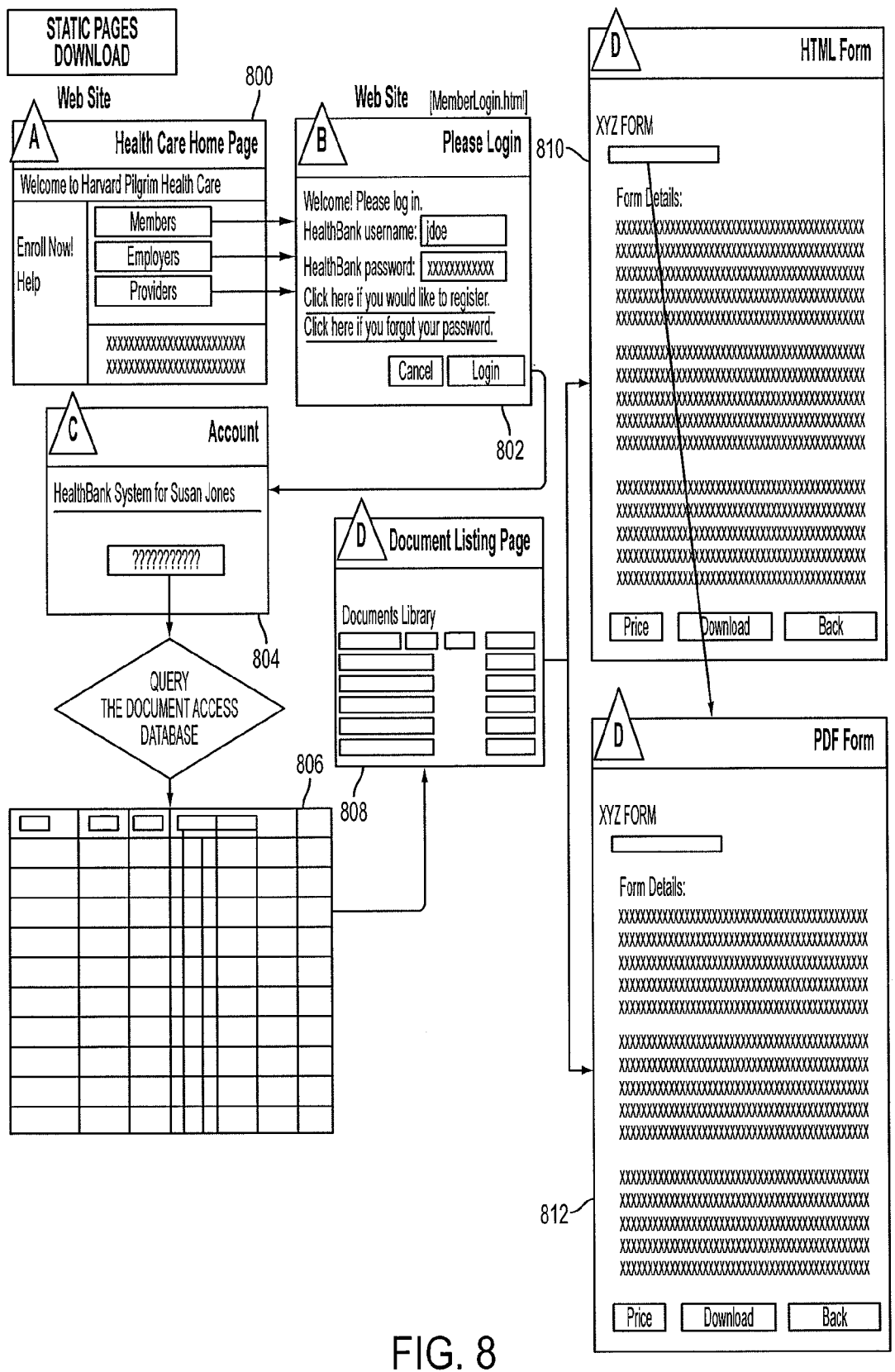
FIG. 8 illustrates representative screen displays and process flow for downloading static pages in the system.

FIG. 8 illustrates the process flow and display screens for downloading static pages. This function may also be provided by the inquiry module. The routine begins with the user navigating to the MCO home page 800 and then to the system login page 802. Upon login, the Account page 804 is returned. Upon selection of the Printed Materials button, the routine tests to identify what document has been selected from the access database 806. An appropriate Document Listing Page 808 is then returned to the browser. Once the user selects the document to be printed, the browser retrieves the appropriate HTML form 810. A read-only version 812, e.g., in .pdf format, may be retrieved by selecting a button in the HTML page.

Figure 9:
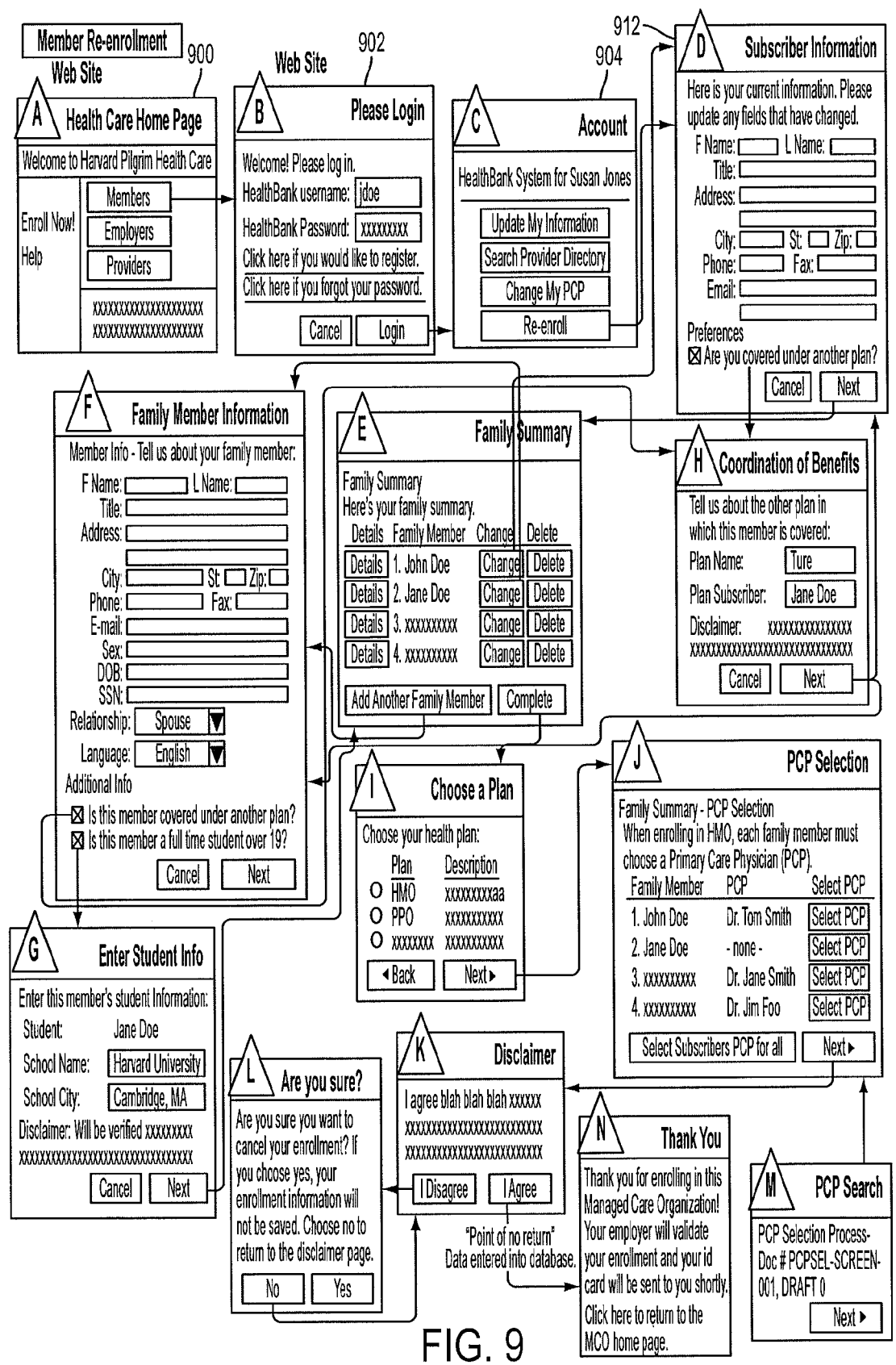
FIG. 9 illustrates representative screen displays and process flow for a member re-enrollment function.

FIG. 9 illustrates screen displays and illustrative process flow for a member re-enrollment function. The routine begins with the user navigating to the MCO home page 900 and then to the system login page 902. Upon login, the Account page 904 is returned. Upon selection of the Re-enroll button, the Subscriber Information page 912 is returned. From this point forward, the enrollment functionality is similar described above with respect to the screens that are common to FIGS. 4A-4B.

Figure 10:
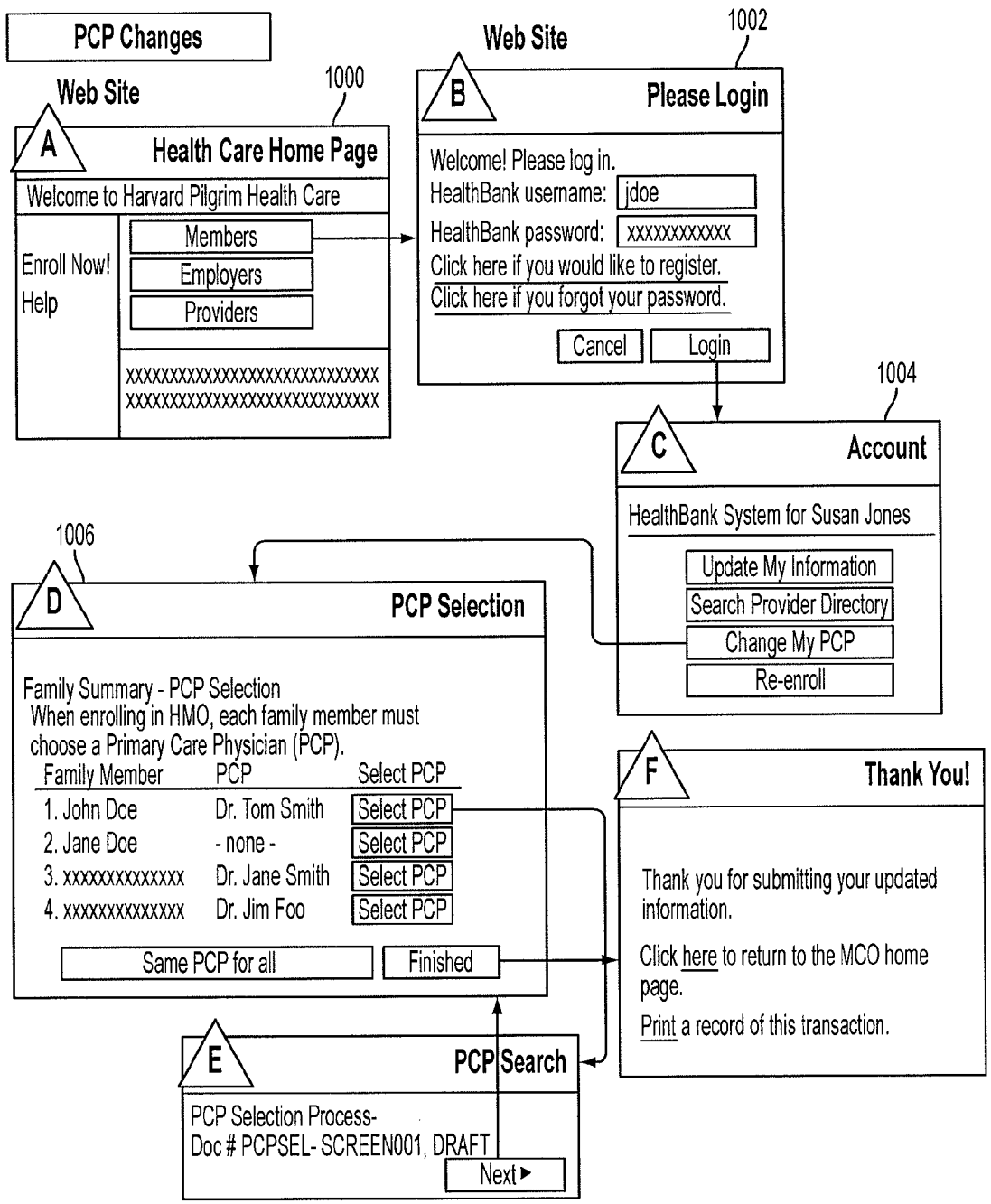
FIG. 10 illustrates representative screen displays and process flow for a PCP change function.

FIG. 10 illustrates screen displays and illustrative process flow for a PCP change function. The routine begins with the user navigating to the MCO home page 1000, to the system login page 1002, and then to the Account page 1004. From this screen, the user selects a Change a PCP button. As a result, the PCP Selection page 1006 is returned. This function was described previously in FIGS. 4A-4B.

Figure 11:
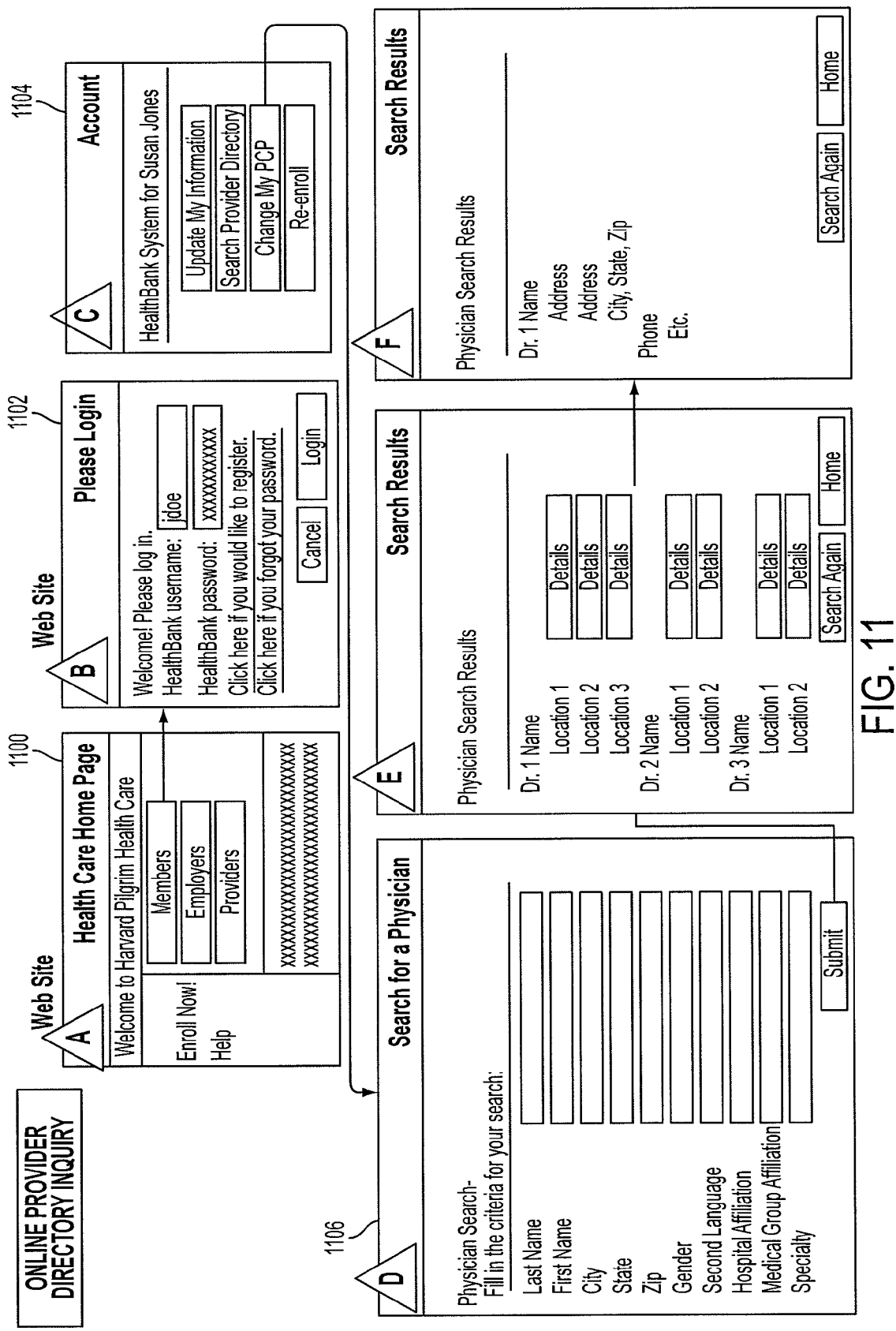
FIG. 11 illustrates representative screen displays and process flow for a Provider Directory inquiry function.

FIG. 11 illustrates screen displays and illustrative process flow for a Provider Directory inquiry. The routine begins with the user navigating to the MCO home page 1100, to the system login page 1102, and then to the Account page 1104. Upon selection of a Search Provider Directory button, the browser navigates to a Search For A Physician page 1106. This functionality was described above in FIG. 6.

Figure 12:
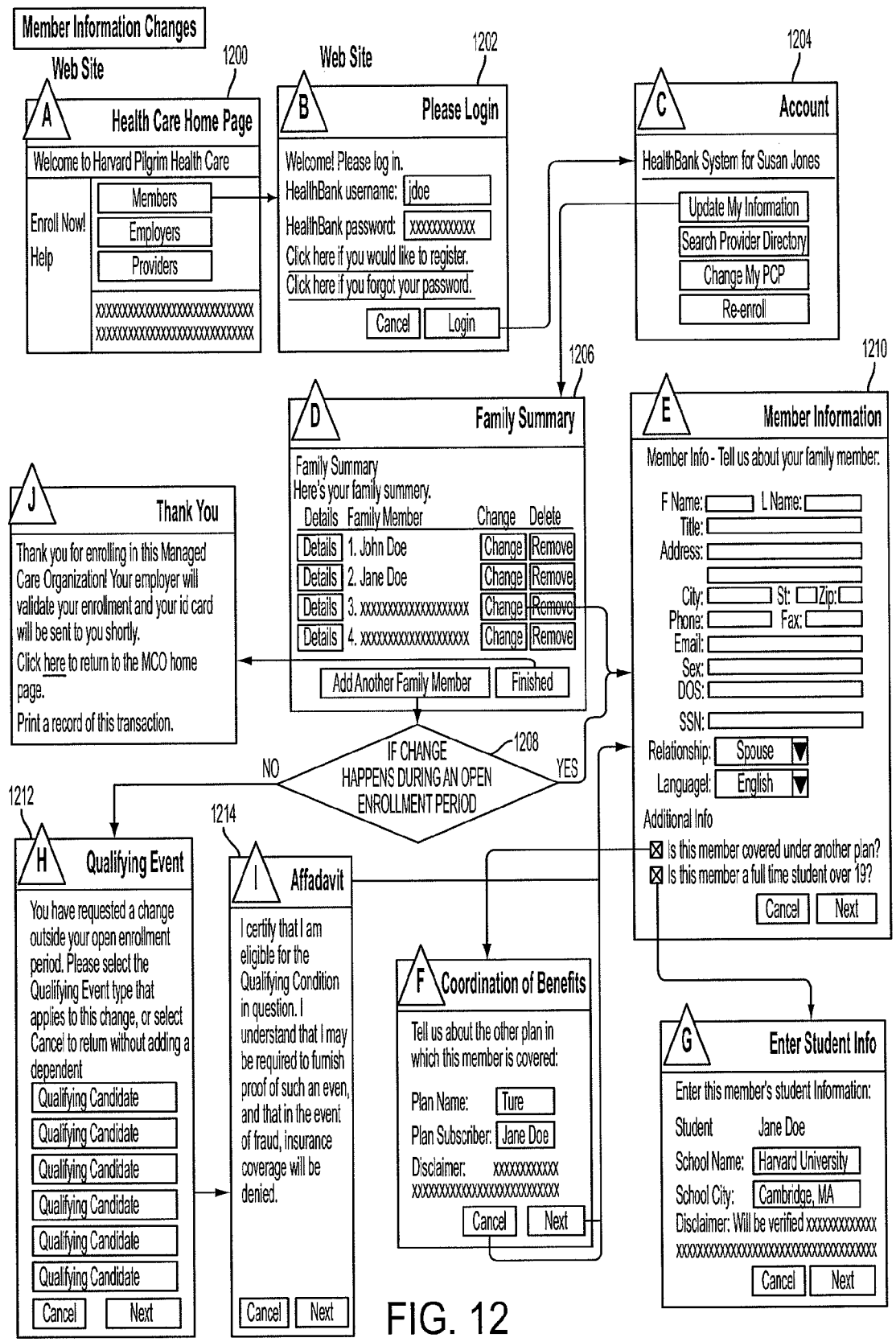
FIG. 12 illustrates representative screen displays and process flow for Member Information Change function.

FIG. 12 illustrates screen displays and illustrative process flow for a Member Information Change function. The routine begins with the user navigating to the MCO home page 1200, to the system login page 1202, and then to the Account page 1204. Upon selection of an Update My Information button, the browser navigates to a Family Summary page 1206. This page was previously described in FIGS. 4A-4B. If the Add Another Family Member button is selected, a test is run at step 1208 to determine if the change happens during an open enrollment period. If so, the browser returns the Member Information page 1210 as previously described in FIGS. 4A-4B. If, however, the outcome of the test at step 1208 is negative, the browser returns a Qualifying Event page 1212, which indicates that the user has requested a change outside of his or her open enrollment period. In such case, the user selects the appropriate Qualifying Condition button, and the browser returns an Affidavit page 1214 to allow the change to be processed.

According to a feature of the present invention, a novel account structure is used to manage administrative transactions (e.g., enrollment, changes, inquiries, claims, benefits, etc.) across multiple plans. The account comprises a linked set of data tables that are organized into a logical entity in a database stored in memory or permanent storage. The database is then accessible to the web-based managed care transaction system. As a user moves from one job to another, or as a given plan is changed or replaced, the user's past history remains persistent and accessible from the account. Thus, the account provides a complete member history that is persistent across plan changes, employment changes, family history changes, and the like. The account allows members the opportunity to review and manage the many aspects of their personal care through a web browser. As will be seen, the account includes a record of the member's healthcare benefits throughout their life.

Figure 13A:
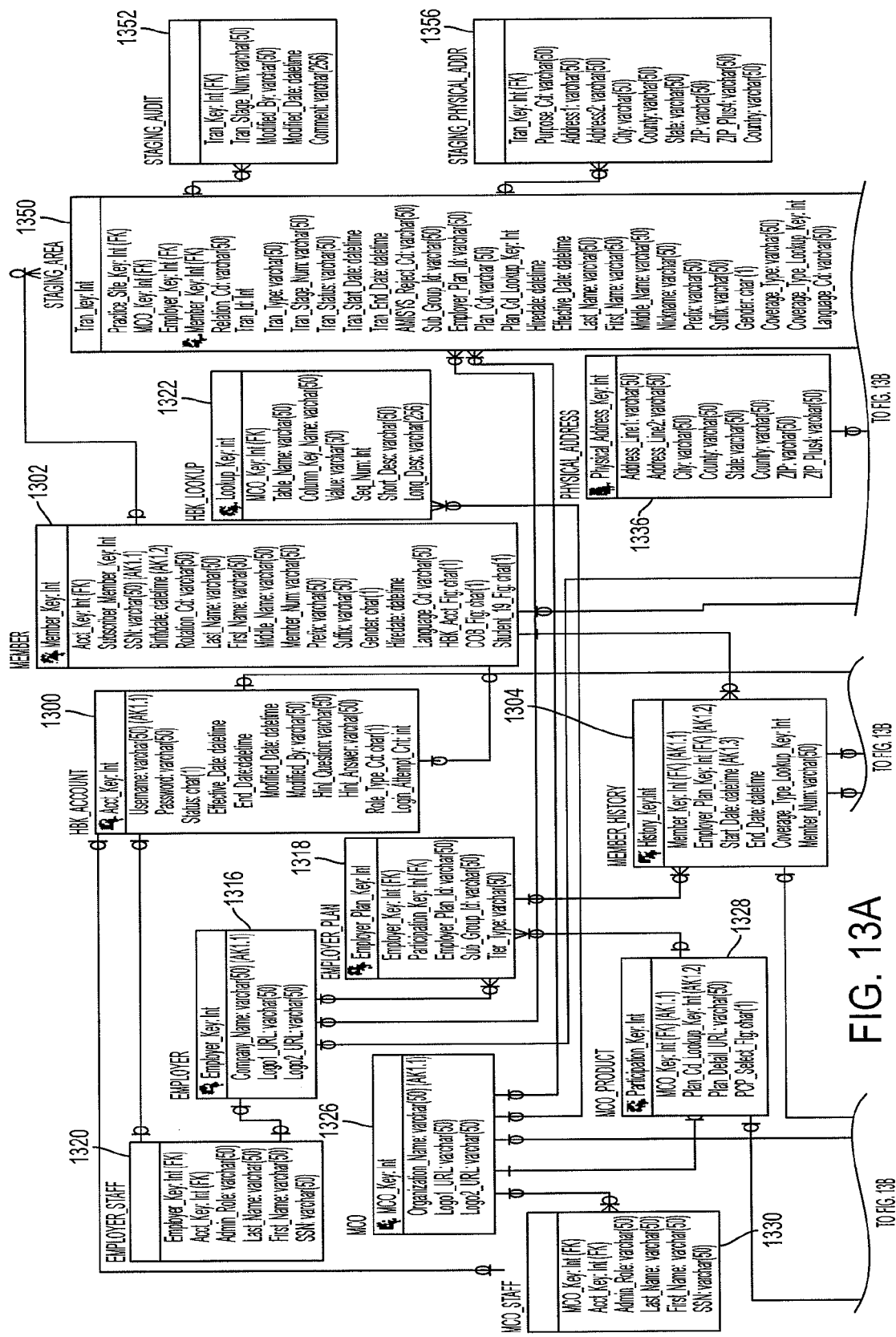
FIGS. 13A-13C show a data entity diagram illustrating the tables that comprise the member administrative account according to the present invention.
Figure 13B:
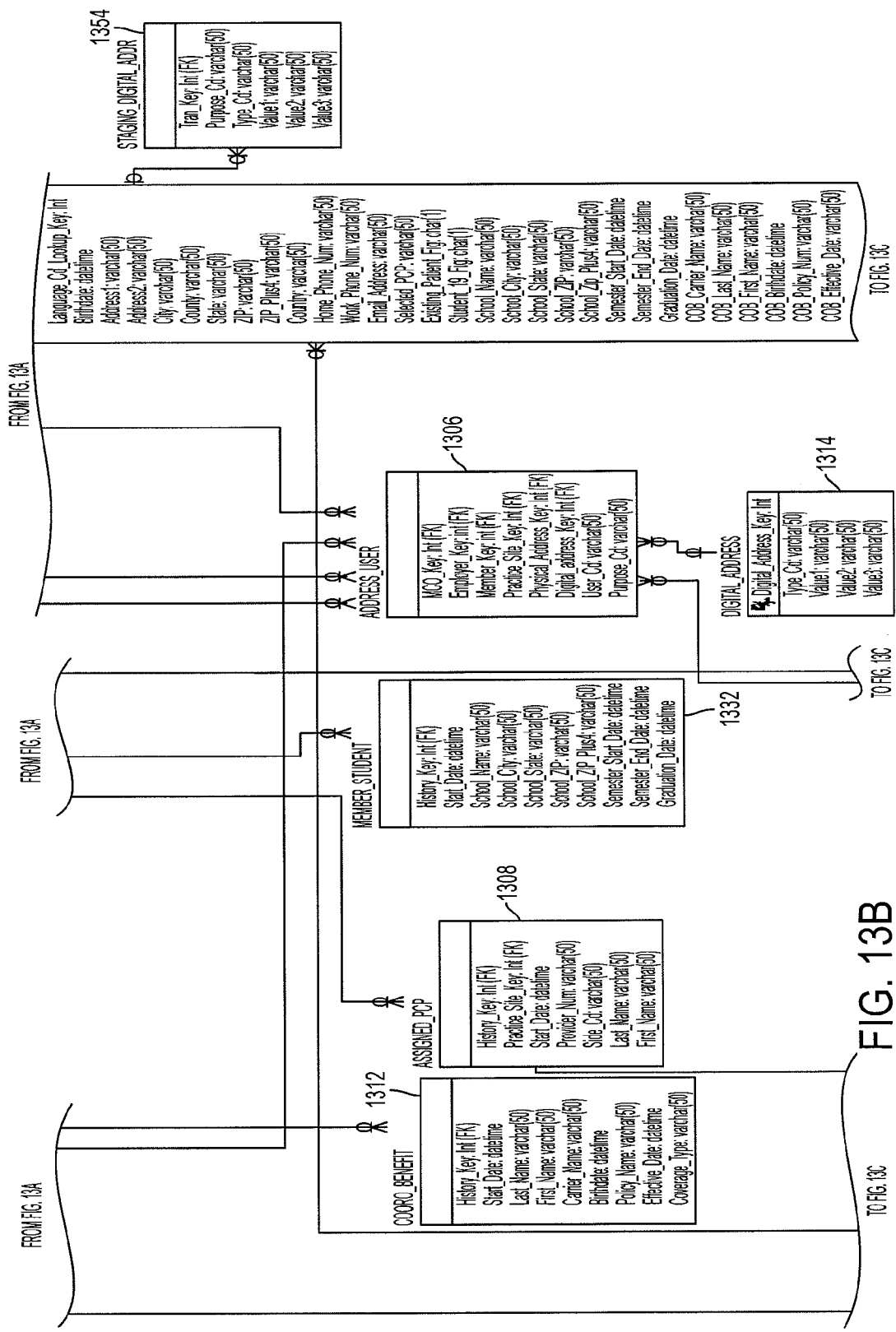
Figure 13C:
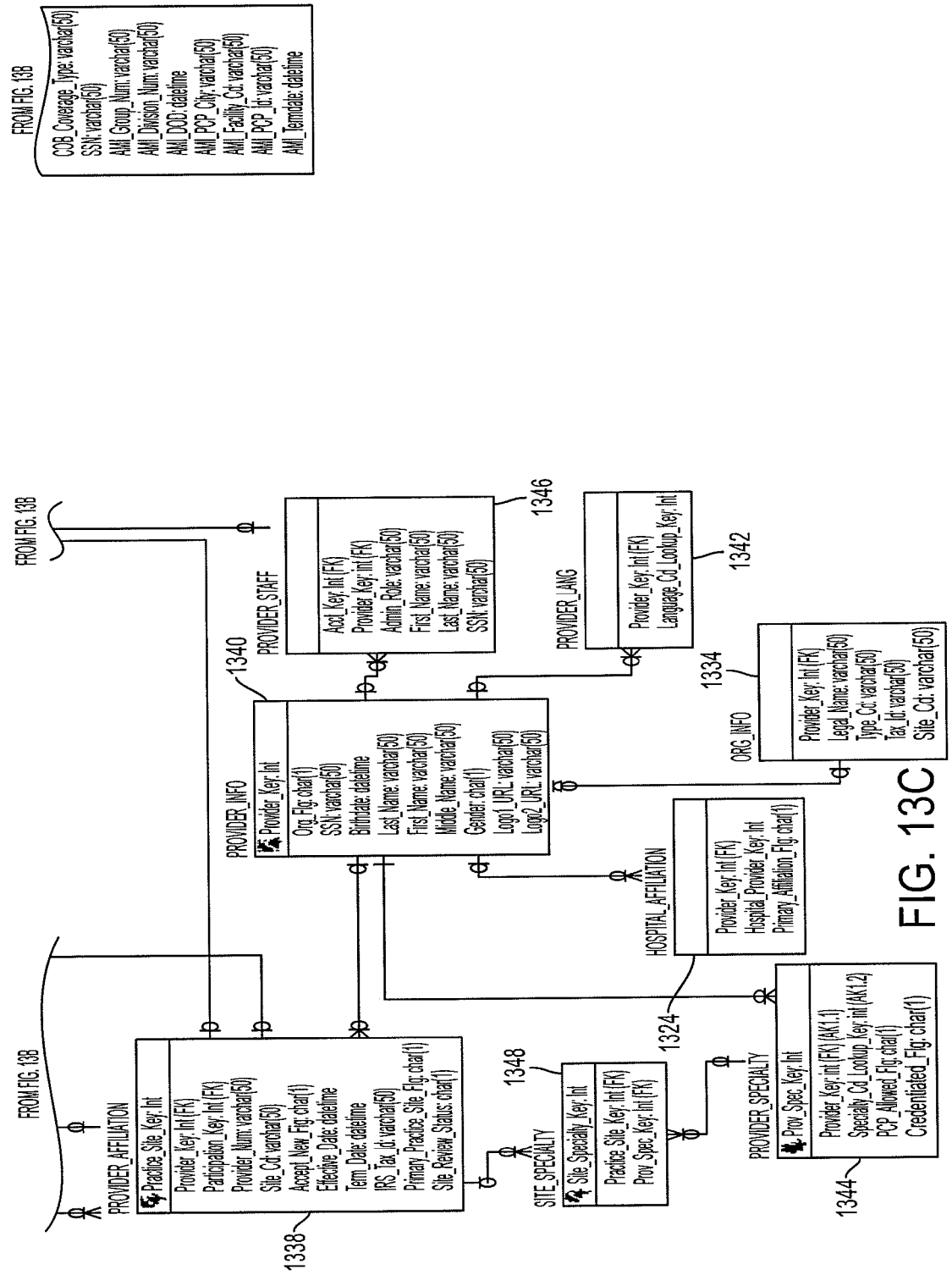

The account, called ACCOUNT in an illustrative embodiment, is shown in the data entity relationship diagram of FIGS. 13A-13C. Each block in this diagram is a table that includes a number of attributes. A particular table may have a 1:1 or a 1:many relationship to another table. Thus, for example, the master account (ACCOUNT table 1300) has a 1:1 relationship to the MEMBER table 1302 because each account has only one member associated therewith. The MEMBER table 1302 has a 1:many relationship with MEMBER HISTORY table 1304 as a given member may have a history of involvement with more than one health plan.

Each of the tables is described generally below:

ADDRESS USER 1306—is the generic address participation matrix identifying a user type (members, PCPs, employers) to possible purposes (home, work, mailing, billing, etc.);

ASSIGNED PCP 1308—is the selected Primary Care Physician for a member enrollment period;

CLAIMS INFO 1310—includes all claims-related information;

COORD BENEFIT 1312—identifies the coordination benefits for the member;

DIGITAL ADDRESS 1314—identifies the electronic and/or digital contacts for an individual;

EMPLOYER 1316—identifies the employer entity, typically a corporation that has a contract with a health organization to provide services to its employees;

EMPLOYER PLAN 1318—identifies the various plans that the Employer group has contracted with an MCO. The data includes Group Number, Division Number, Employer Plan ID, and a selected MCO Product/Plan is part of the designated health plan offering to the employee;

EMPLOYER STAFF 1320—identifies what users of the Employer group are allowed access to the system via an account setup process;

ACCOUNT 1300—is the account setup information that contains userID/password and helpful things to login and use the secured site;

LOOKUP 1322—is a lookup table for allowable values for a table/column_lookup_key combination in the schema;

HOSPITAL AFFILIATION 1324—is a table that identifies all hospital affiliations associated for this particular provider;

MCO 1326—is the managed care organization entity. This is the healthcare organization that is contracting with an Employer Entity, thus providing service to the Employer's employees;

MCO PRODUCT 1328—is a table listing plans or products that are provided by a health care organization;

MCO STAFF 1330—is a table that identifies what users of the managed healthcare group are allowed access to the system via the account setup process;

MEMBER 1302—is a table that identifies personal data for each member;

MEMBER HISTORY 1304—is a table that describes the participation history of a member. This table identifies the relationship and history of what healthcare plan the member has enrolled in all companies for which he or she worked;

MEMBER STUDENT 1332—is a table identifying information about the school and location if the member is a fulltime student;

ORG INFO 1334—is a table that is relevant if the provider in the PROVIDER INFO table is identified as an organization provider;

PHYSICAL ADDRESS 1336—is a table identifying actual physical addresses that can be associated to anyone or any corporation;

PROVIDER AFFILIATION 1338—is a table that provides the intersection information of a provider practicing what allowable specialties at a practice site;

PROVIDER INFO 1340—is a table describing the provider selected by the member;

PROVIDER LANG 1342—identifies all languages in which this provider can communicate with his or her patient;

PROVIDER SPECIALTY 1344—identifies all specialties practiced by this provider;

PROVIDER STAFF 1346—identifies all staff members to a particular provider who require access to the system via the account setup process;

SITE SPECIALTY 1348—is an intersection table to show a provider's specialties that are practiced at a particular site;

STAGING AREA 1350—is a table that tracks the process of a member through the system for various transaction events, e.g., enrollment, profile change, or the like;

STAGING AUDIT 1352—is an audit log for a specific record;

STAGING DIGITAL ADDR 1354—is a table that contains other digital addresses that are related to this particular Staging Area record; and STAGING PHYSICAL ADDR 1356—is a table that contains other physical addresses that are related to this particular Staging Area record.

The following is a detailed Data Dictionary for each of the above tables, with each attribute identified by name and description.

| Entity Name | Entity Description | Attribute Name | Attribute Description | PK | Req | FK |
| --- | --- | --- | --- | --- | --- | --- |
| ADDRESS USER | This is the generic Address participation matrix identifying a user type (members, pcp's, employers) to | Purpose Cd | This identifies the purpose of this address; such as: "1. PR = Practice Address" "2. HM = | No | Yes | No |

-continued

| Entity Name | Entity Description | Attribute Name | Attribute Description | PK | Req | FK |
|---|---|---|---|---|---|---|
| | possible purposes (home, work, mailing, billing, etc.). | | Home Address" "3. BL = Billing Address" "4. ML = Mailing Address" "5. WK = Work Address" | | | |
| | | User Cd | The identifies the user types of this address matrix. Supported types may include: "1. MEM = Member" "2. MCO = MCO" "3. EMP = Employer Group" "4. PPS = Provider Practice Site" | No | Yes | No |
| | | Digital Address Key | Unique type identifier of digital address. | No | No | Yes |
| | | Employer Key | Unique lookup key that identifies this employer coverage based on a contract number with a MCO. | No | No | Yes |
| | | MCO Key | Unique managed care identifier key. | No | No | Yes |
| | | Member Key | This identifies a unique Member; currently based on Social Security Number and Date-Of-Birth. | No | No | Yes |
| | | Physical Address Key | Unique record identifier of this address. | No | No | Yes |
| | | Practice Site Key | This key uniquely identifies a practice site for a provider. This practice details the MCO product that is provided by this doctor. | No | No | Yes |
| | | AMI Addr Who | This is a placeholder attribute used by the AMISYS source load group. | No | No | No |
| ASSIGNED PCP | This is the selected Primary Care Physician for a member enrollment period. | History Key | This is a unique reference key to a specific member working for a specific employer enrolled in a specific plan for a specific enrollment period. Basically, add Start Date, Coverage Type, Group/Division Id, and Employer Plan Id to the specified list of foreign keys. | No | Yes | Yes |
| | | Practice Site Key | This key uniquely identifies a practice site for a provider. This practice details the MCO product that is provided by this doctor. | No | Yes | Yes |
| | | First Name | Provider's first name | No | Yes | No |
| | | Last Name | Provider's last name. | No | Yes | No |
| | | Start Date | Start date of this PCP for this member's span. | No | Yes | No |
| | | Provider Num | A provider number recognized by a particular MCO. For example, this relates | No | No | No |

-continued

| Entity Name | Entity Description | Attribute Name | Attribute Description | PK | Req | FK |
|---|---|---|---|---|---|---|
| | | Site Cd | to the PROV# field in ANISYS. A term identifying the Site Code of the group practice that the physician belongs to. | No | No | No |
| CLAIMS INFO | FUTURE . . . A generic cut at all relevant claims related information. | Claims Reference Key | | Yes | Yes | No |
| | | Site Specialty Key | A unique identifier based on all of a provider's specialties at this site. | No | Yes | Yes |
| | | Member Key | | No | Yes | No |
| | | Affiliation Fund Amt | | No | No | No |
| | | Attending Local Risk Unit | | No | No | No |
| | | Attending Provider Key | | No | No | No |
| | | Attending Sub Risk Unit | | No | No | No |
| | | Authorization Num | | No | No | No |
| | | Billed Amt | | No | No | No |
| | | Claim Adjustment Amt | | No | No | No |
| | | Claim Payment Date | | No | No | No |
| | | Claim Status | | No | No | No |
| | | Claim Type Cd | | No | No | No |
| | | Coinsurance Amt | | No | No | No |
| | | Copay Amt | | No | No | No |
| | | Deductible Amt | | No | No | No |
| | | Diagnosis 1 Service Line | | No | No | No |
| | | Diagnosis 2 Service Line | | No | No | No |
| | | Discharge Status | | No | No | No |
| | | Fee For Service Amt | | No | No | No |
| | | Financial Service Type | | No | No | No |
| | | ICD 9 Num | | No | No | No |
| | | Medicare Payment Amt | | No | No | No |
| | | Paid Amt | | No | No | No |
| | | PCP Local Risk Unit | | No | No | No |
| | | PCP Provider Key | | No | No | No |
| | | PCP Sub Risk Unit | | No | No | No |
| | | Pool Name | | No | No | No |
| | | Primary Insurance Cd | | No | No | No |
| | | Procedure Desc | | No | No | No |
| | | Referring Local Risk Unit | | No | No | No |
| | | Referring Provider Key | | No | No | No |
| | | Referring Sub Risk Unit | | No | No | No |
| | | Risk Withheld Amt | | No | No | No |
| | | Service End Date | | No | No | No |
| | | Service Start Date | | No | No | No |
| | | Servicing Local Risk Unit | | No | No | No |
| | | Servicing Provider Key | | No | No | No |
| | | Servicing Sub Risk Unit | | No | No | No |
| | | TPP Amt | | No | No | No |
| COORD BENEFIT | This is the coordination of benefits for the member. Shared cost to another insurance group | History Key | This is a unique reference key to a specific member working for a specific employer enrolled in a specific plan for a specific enrollment period. Basically, add Start Date, Coverage Type, Group/Division Id, and Employer Plan Id to the specified list of foreign keys. | No | Yes | Yes |

-continued

| Entity Name | Entity Description | Attribute Name | Attribute Description | PK | Req | FK |
|---|---|---|---|---|---|---|
| | | Start Date | Start date of this COB coverage. | No | Yes | No |
| | | Birthdate | Birthday of the associated subscriber providing this additional coverage term. | No | No | No |
| | | Carrier Name | Name of the additional insurance coverage provider. | No | No | No |
| | | Coverage Type | The coverage type of this policy; i.e. Self, Spouse, Dependents, Medicare, Medical, Dental, etc. | No | No | No |
| | | Effective Date | The effective date of this secondary policy. | No | No | No |
| | | First Name | First name of subscriber to this secondary policy/plan. | No | No | No |
| | | Last Name | Last name of associated subscriber to this additional plan. | No | No | No |
| | | Policy Num | Insurance policy number for this coordinate benefit. | No | No | No |
| DIGITAL ADDRESS | This is the electronic and/or digital contacts for an individual. | Digital Address Key | Unique type identifier of digital address. | Yes | Yes | No |
| | | Type Cd | This code defined the various types: "1. VC = Voice/Land phone" "2. CL = Cell phone" "3. PG = Pager" "4. EM = Email" "5. WB = Web HomePage" | No | Yes | No |
| | | Value1 | Contains initial value associated with a type of digital address. For example - voice mail includes: 800.555.1212 or abc@foobar.com for Email type. | No | Yes | No |
| | | Value2 | This may be a second value set to a specific type of digital address. For example - voice mail may include an extension part to the original phone number. | No | No | No |
| | | Value3 | This third value association is for obscure elements like answer back string to a modem connect and/or future electronic requirements. | No | No | No |
| EMPLOYER | This is an employer entity; it identifies an corporation (i.e. General Electric) that has a contract with a health organization to provide services to its employees. | Employer Key | Unique lookup key that identifies this employer coverage based on a contract number with a MCO. | Yes | Yes | No |

-continued

| Entity Name | Entity Description | Attribute Name | Attribute Description | PK | Req | FK |
| --- | --- | --- | --- | --- | --- | --- |
| | | Company Name | Name of an Employer contracting with a MCO for services for its employees. For example, General Electric. | No | Yes | No |
| | | Logo1 URL | Location of primary employer graphical logo. | No | No | No |
| | | Logo2 URL | Location of secondary employer graphical logo. | No | No | No |
| EMPLOYER PLAN | This identifies the various plans that the Employer group have contracted with a MCO. Group number, Division number, Employer Plan id, and a selected MCO Product/Plan is part of the designated health plan offering to the employee. | Employer Plan Key | This uniquely identifies a particular plan that an Employer Group is providing for its employees. | Yes | Yes | No |
| | | Employer Key | Unique lookup key that identifies this employer coverage based on a contract number with a MCO. | No | Yes | Yes |
| | | Participation Key | This identifies a specific product that a health care organization will provide for service to any employer groups. | No | Yes | Yes |
| | | Employer Plan Id | This is the employer plan id; it should uniquely identify the Employer to a Contract Id for a certain SubGroup (Group/Division) that it expect healthcare coverage from a MCO. This identifier will be a generated value; format = TBD. | No | Yes | No |
| | | Sub GroupId | This is the Employer group number that is known to the health care provider. For example, Union and Non-Union are two different subgroups under a single employer plan with a MCO. | No | Yes | No |
| | | Tier Type | Tier Type that is associated with this Employer/MCO contract/plan. This value is derived from the same source that provides for the Sub Group Id. For HHPC, the various Tier Types (Value field in LOOKUP) are: 1. "02" 2. "03" 3. "04" 4. "05" 5. "06" 6. "7" 7. "3S" 8. "ME" 9. "MR" 10. "SP" Note that tier types drive what | No | Yes | No |

-continued

| Entity Name | Entity Description | Attribute Name | Attribute Description | PK | Req | FK |
|---|---|---|---|---|---|---|
| | | | coverage/contract types are allowed for this particular plan - i.e. Single; Family; etc. For example, in the corresponding LOOKUP table, "I" will populate the Short_Desc field; and "Individual" will populate the Long Desc field. | | | |
| | | Open Enroll End Date | Identifies the end date for open enrollment for this particular plan/sub group. | No | No | No |
| | | Open Enroll Start Date | Identifies the start date for open enrollment for this particular plan/sub group. | No | No | No |
| | | Sub Group Effective Date | Identifies the effective date for enrollment allowed by this particular plan/sub group. | No | No | No |
| | | Sub Group Text | This field will enable a textual description of the associated SubGroupid; if SubGroupid is a pure numeric value. For example, uses SubGroupId values like: 066131000; this represents the Group/Division number. | No | No | No |
| | | Waiting Period Days | Identifies the waiting period that is required by this plan/sub group for the member applicant. | No | No | No |
| EMPLOYER STAFF | This table identifies what users of the Employer group are allowed access to Web Server via the account setup process. | Employer Key | Unique lookup key that identifies this employer coverage based on a contract number with a MCO. | No | Yes | Yes |
| | | Admin Role | This identifies the particular role that the system allows the Employer group to control what security levels to access what part of the database. | No | Yes | No |
| | | Acct Key | This is unique Key based on Username. | No | No | Yes |
| | | First Name | First Name of Employer group user. | No | No | No |
| | | Last Name | Last name of Employer group user. | No | No | No |
| | | SSN | Social security number to uniquely identify the user. | No | No | No |
| ACCOUNT | This is account setup information. It will contain username/password and "helpful" hints to login and use secured site. | Acct Key | This is unique Key based on Username. | Yes | Yes | No |

-continued

| Entity Name | Entity Description | Attribute Name | Attribute Description | PK | Req | FK |
|---|---|---|---|---|---|---|
| | | Effective Date | The effective start date that this account will be active. | No | Yes | No |
| | | Password | Account user's chosen PASSWORD | No | Yes | No |
| | | Username | Account member's chosen USERNAME. | No | Yes | No |
| | | End Date | The effective end date of this HBK account. | No | No | No |
| | | Hint Answer | This is the user's specific answer to the above Hint Question; it should correspond to the user defined question. If the user types in the correct answer, the assigned Password to the Username is displayed, and the user can try login on again. | No | No | No |
| | | Hint Question | This is user defined question that the user can designate as an alternate way of logging into the system. For example: "What's my favorite color?" | No | No | No |
| | | Login Attempt Cnt | This is a counter that reflects the number of times the user is trying to log into the system. | No | No | No |
| | | Modified By | Audit purpose to capture who last modified this record. | No | No | No |
| | | Modified Date | Audit purpose to capture the last modified date of this record. | No | No | No |
| | | Role Type Cd | This is a place holder attribute for future releases of the system. Role Type can further define a Username within the system into either a Member or Provider role type. For example, a Member who is also a Provider can have the same login Username; role type can differentiate what classification the user wants to be. | No | No | No |
| | | Status | The status of the user login session. | No | No | No |
| LOOKUP | This is a lookup table for allowable values for a table/column_lookup_key combination in the schema. Note that the foreign key - MCO_Key - is optional in this table; if the set of lookup values is generic across all MCO's, then this | Lookup Key | This uniquely identifies a table/column/value combination. | Yes | Yes | No |

-continued

| Entity Name | Entity Description | Attribute Name | Attribute Description | PK | Req | FK |
|---|---|---|---|---|---|---|
| | field is NULL; otherwise a specific MCO set of lookup values will have field pointing to the specific MCO. | | | | | |
| | | Column Key Name | The column key name for the specified table. For example, the table - MCO_PRODUCT - has a column called Plan_Cd_Lookup_Key. So the Column_Key_Name in this LOOKUP table will be "Plan Cd". | No | Yes | No |
| | | Table Name | The table name in schema. | No | Yes | No |
| | | Value | Actual value returned for the table/column combination. For example, in MCO_PRODUCT table - for column Plan_Cd - a possible value can be 'IH'; which stands for Integrated HMO Product. | No | Yes | No |
| | | MCO Key | Unique managed care identifier key. | No | No | Yes |
| | | Long Desc | | No | No | No |
| | | Seq Num | Allows for ordering of values. | No | No | No |
| | | Short Desc | | No | No | No |
| HOSPITAL AFFILIATION | This table identifies all hospital affiliations associated for this particular provider. | Provider Key | An internal unique provider identifier. | No | Yes | Yes |
| | | Hospital Provider Key | This is internal unique provider key that identifies the hospital as the Organization provider. Look at ORG_INFO table for organization type of a hospital facility. | No | Yes | No |
| | | Primary Affiliation Flg | Future . . . A 'Y'es or 'N'o indicator; it identifies whether this hospital is the primary facility for this provider to treat patients. | No | No | No |
| MCO | Managed Care Organization Entity. This is a healthcare organization that is contracting with an Employer Entity; thus providing service to the Employer's employees. | MCO Key | Unique managed care identifier key. | Yes | Yes | No |
| | | Organization Name | Name of managed care organization. | No | Yes | No |
| | | Logo1 URL | Location of primary MCO graphical logo. | No | No | No |
| | | Logo2 URL | Location of secondary MCO graphical logo. | No | No | No |
| MCO PRODUCT | This is the list of plans that is provided by a health care organization. Plans and products | Participation Key | This identifies a specific product that a health care organization will provide for service | Yes | Yes | No |

-continued

| Entity Name | Entity Description | Attribute Name | Attribute Description | PK | Req | FK |
|---|---|---|---|---|---|---|
| | are synonymous in meaning. | | to any employer groups. | | | |
| | | MCO Key | Unique managed care identifier key. | No | Yes | Yes |
| | | Plan Cd Lookup Key | Contains the appropriate Lookup Key in LOOKUP table for Plan Cd. See definition of Plan Cd field. This is the plan code or name that is offered by the MCO. | No | Yes | No |
| | | PCP Select Flg | This identifies whether a product requires a PCP selection. Allowable values will be 'Y' or 'N'. | No | No | No |
| | | Plan Detail URL | This points to a web page for the description to this product/plan code. | No | No | No |
| MCO STAFF | This table identifies what users of the Managed Healthcare group are allowed access to the system via the account setup process. | MCO Key | Unique managed care identifier key. | No | Yes | Yes |
| | | Admin Role | This identifies the particular role that the system allows the group to control what security levels to access what part of the database. | No | Yes | No |
| | | Acct Key | This is unique Key based on Username. | No | No | Yes |
| | | First Name | First name of this MCO-based user. | No | No | No |
| | | Last Name | Last name of the MCO-based user. | No | No | No |
| | | SSN | Social security number to uniquely identify this MCO-based user. | No | No | No |
| MEMBER | This table identifies any member. | Member Key | This identifies a unique Member; currently based on Social Security Number and Date-Of-Birth. | Yes | Yes | No |
| | | Birthdate | Date of birth of this member. | No | Yes | No |
| | | First Name | First name of this member. | No | Yes | No |
| | | HBK Acct Flg | This flag condition shows that the member has a username/password account already. It is a Yes/No condition. | No | Yes | No |
| | | Last Name | Last name of this member. | No | Yes | No |
| | | Relation Cd | This field indicates the relationship of member to the primary subscriber of plan. Current Relation Code recognized are: 01 = Self 02 = Spouse 03 = Unmarried child under 19 04 = Unmarried stepchild | No | No | No |

| Entity Name | Entity Description | Attribute Name | Attribute Description | PK | Req | FK |
|---|---|---|---|---|---|---|
| | | | under 19 05 = Unmarried fulltime student over 19 06 = Handicapped 07 = Ex-Spouse | | | |
| | | SSN | US-based Social Security Number. | No | Yes | No |
| | | Subscriber Member Key | This identifies a plan's subscriber; the primary and known employee to the employer group. The idea is that dependant member will always point back to the plan's primary subscriber id. If Member Key = Subscriber Member Key, then this record identifies the primary plan member. | No | Yes | No |
| | | Acct Key | This is unique Key based on Username. | No | No | Yes |
| | | COB Flg | A Yes/No flag indicator to identify if this member have the additional COB coverage. | No | No | No |
| | | Gender | This is a single character column; note that this is an optional field: 1. M = Male 2. F = Female | No | No | No |
| | | Hiredate | This is the hiring anniversary date of the member to the employer group that he/she belongs to. | No | No | No |
| | | Language Cd | The language code that is preferred by this member. For example, 1. AS - American Sign Language 2. CA - Cantonese 3. EN - English 4. IT - Italian 5. SP - Spanish etc. | No | No | No |
| | | Member Num | This is a place holder for a member id/number that can uniquely identify this member to the system. For example, assigned Member# will be used here; i.e. HP12346700 for the subscriber member and HP12346701 for a spouse to this subscriber. Note that this field will be NULL; if a complete new member enrollment. The expectation is that the MCO will assign this member a number once the request goes through the normal business process. | No | No | No |
| | | Middle Name | Middle name of this member. | No | No | No |
| | | Prefix | The relates to what the member wants to | No | No | No |

-continued

| Entity Name | Entity Description | Attribute Name | Attribute Description | PK | Req | FK |
|---|---|---|---|---|---|---|
| | | | be addressed with; i.e. Mr, Ms, Mrs, Dr, etc. | | | |
| | | Student 19 Flg | If member is a student over 19, require additional information. A 'Y'es or 'N'o indication is required. | No | No | No |
| | | Suffix | This relates to what the member wants to be addressed with at the end of his name; i.e. Paul Williams III - John Smith, ESQ. | No | No | No |
| MEMBER HISTORY | This entity describes the participation history of a member. It will show the relationship and history of what healthcare plan he has enrolled in all companies that he had worked for. | History Key | This is a unique reference key to a specific member working for a specific employer enrolled in a specific plan for a specific enrollment period. Basically, add Start Date, Coverage Type, Group/Division Id, and Employer Plan Id to the specified list of foreign keys. | Yes | Yes | No |
| | | Employer Plan Key | This uniquely identifies a particular plan that an Employer Group is provider for its employees. | No | Yes | Yes |
| | | Member Key | This identifies a unique Member; currently based on Social Security Number and Date-Of-Birth. | No | Yes | Yes |
| | | Coverage Type Lookup Key | The parameters to LOOKUP table will be based on the type of healthcare coverage that the member is subscribing to: 1. I = Individual, 2. F = Family, 3. etc. Note that the various Coverage Types are different; depending on the Tier Type (in EMPLOYER_PLAN table) that is associated with Plan/Contract/Sub Group Id. | No | Yes | No |
| | | End Date | Effective end date of this member's participation in healthcare coverage. | No | Yes | No |
| | | Start Date | Effective start date of this member's participation in healthcare coverage. | No | Yes | No |
| | | Member Num | This field is captured for historical purposes only; the data should be read from the active Member Num during this enrollment span. | No | No | No |

-continued

| Entity Name | Entity Description | Attribute Name | Attribute Description | PK | Req | FK |
|---|---|---|---|---|---|---|
| | | | This is a place holder for a member id/number that can uniquely identify this member. For example, assigned Member# will be used here; i.e. H212346700 for the subscriber member and HP12346701 for a spouse to this subscriber. Note that this field will be NULL; if a complete new member enrollment. | | | |
| MEMBER STUDENT | If a member is a fulltime student over 19, require information of the school and its city and state. | History Key | This is a unique reference key to a specific member working for a specific employer enrolled in a specific plan for a specific enrollment period. Basically, add Start Date, Coverage Type, Group/Division Id, and Employer Plan Id to the specified list of foreign keys. | No | Yes | Yes |
| | | School City | The City where the school is located. | No | Yes | No |
| | | School Name | Name of school where the fulltime student is enrolled. | No | Yes | No |
| | | Start Date | Start date of this school of Fulltime Student member. | No | Yes | No |
| | | Graduation Date | The expected graduation date for member from this school. | No | No | No |
| | | School State | The state where the school is located. | No | No | No |
| | | School ZIP | Postal zipcode of school. | No | No | No |
| | | School ZIP Plus4 | Long postal zipcode of school. | No | No | No |
| | | Semester End Date | The end date of member's school semester. | No | No | No |
| | | Semester Start Date | The start date of member's school semester. | No | No | No |
| ORG INFO | This table is only relevant if the Provider in PROVIDER INFO table is identified as an organization provider. Since Organization Provider is a non person; a different set of data is kept; for example, legal corporate name; a tax id; etc. | Provider Key | An internal unique HBK provider identifier. | No | Yes | Yes |
| | | Legal Name | A full legal name of this organization; i.e. Mass. General Hospital. | No | Yes | No |
| | | Type Cd | Future . . . This type code classifies what organization type is this org. provider; | No | Yes | No |

| Entity Name | Entity Description | Attribute Name | Attribute Description | PK | Req | FK |
|---|---|---|---|---|---|---|
| | | | i.e. Facilities - Hospitals; Group Practices; etc. | | | |
| | | Site Cd | The Site Cd to identify this organization provider. | No | No | No |
| | | Tax Id | Future . . . This is the legal tax identifier for this org. provider. | No | No | No |
| PHYSICAL ADDRESS | The actual physical addresses that can be associated to anyone or corporation; i.e. Mailing, Home, Work, etc. | Physical Address Key | Unique record identifier of this address. | Yes | Yes | No |
| | | Address Line1 | Address line 1 containing the typical information of: 123 Main Street | No | Yes | No |
| | | City | City name of physical address, | No | Yes | No |
| | | Country | A recognized Postal Country Code. | No | Yes | No |
| | | County | County name of physical address. | No | Yes | No |
| | | State | State where physical address is based. | No | Yes | No |
| | | ZIP | US based postal zip code. | No | Yes | No |
| | | Address Line2 | Address line 2 containing typical information regarding: P.O. Box; Suite#; Apt#; etc. | No | No | No |
| | | ZIP Plus4 | The longer version of US-based postal zip code. | No | No | No |
| PROVIDER AFFILIATION | This table provides the intersection information of a provider practicing what allowable specialties at a practice site. | Practice Site Key | This key uniquely identifies a practice site for a provider. This practice details the MCO product that is provided by this doctor. | Yes | Yes | No |
| | | Participation Key | This identifies a specific product that a health care organization will provide for service to any employer groups. | No | Yes | Yes |
| | | Provider Key | An internal unique provider identifier. | No | Yes | Yes |
| | | Provider Num | An provider number recognized by a particular MCO. | No | Yes | No |
| | | Site Cd | A term identifying the Site Code to the group practice that the physician belongs to. | No | Yes | No |
| | | Accept New Flg | A conditional flag (Yes/No) to indicate whether a provider is accepting new patients at this particular practice site. | No | No | No |
| | | AMI PlanCd | This is a placeholder attribute used by the AMISYS source load group. | No | No | No |
| | | Effective Date | This effective start date for this | No | No | No |

-continued

| Entity Name | Entity Description | Attribute Name | Attribute Description | PK | Req | FK |
|---|---|---|---|---|---|---|
| | | IRS Tax Id | relationship between MCO and Provider. Tags each affiliation with a Tax Id or SSN. This is tied to the how each provider at each site may have a different tax id for claims payment. | No | No | No |
| | | Primary Practice Site Flg | Indicates whether this site is a primary practice site for this provider. FUTURE . . . This field may belong in SITE SPECIALITY if we need to track primary practice site at a provider's specialty level. | No | No | No |
| | | Site Review Status | This indicates what the site review status for the provider's specialty at this practice site. FUTURE . . . This field may belong in the SITE SPECIALTY table if site review is tracked on the specialty level at a practice site for a provider. | No | No | No |
| | | Term Date | The termination date for this relationship between MCO and Provider. | No | No | No |
| PROVIDER INFO | A table describing the Provider; if a person, then information like SSN; Last and First Name; Gender; etc. This demographics type information is useful to selection by members. Note: if provider is a non-person, then the ORG INFO table will contain equivalent corporate information like: Legal Name; Tax Id; etc. | Provider Key | An internal unique provider identifier. | Yes | Yes | No |
| | | Org Flg | A flag to indicate whether this provider is an individual Clinician/Provider or an organization like: hospital; group practices, etc. A 'Y'condition will force a lookup for name; tax id; site codes in the ORG INFO table. | No | Yes | No |
| | | AMI Provider Num | This is a placeholder attribute used by the AMISYS source load group. | No | No | No |
| | | Birthdate | Birthdate of this Clinician provider. | No | No | No |
| | | First Name | First name of this Clinician provider. | No | No | No |
| | | Gender | This is a single character column; | No | No | No |

| Entity Name | Entity Description | Attribute Name | Attribute Description | PK | Req | FK |
|---|---|---|---|---|---|---|
| | | | note that this is an optional field: 1. M = Male 2. F = Female | | | |
| | | Last Name | Last Name of this Clinician provider. | No | No | No |
| | | Logo1 URL | A primary pointer to a graphical logo for this physician provider. | No | No | No |
| | | Logo2 URL | A secondary pointer to a graphical logo for this physician provider. | No | No | No |
| | | Middle Name | Middle name of this Clinician provider. | No | No | No |
| | | SSN | Social Security of a Clinician provider. | No | No | No |
| PROVIDER LANG | All languages that this provider can communicate with his patients in. | Provider Key | An internal unique HBK provider identifier. | No | Yes | Yes |
| | | Language Cd Lookup Key | Contains the appropriate Lookup Key in HBK_LOOKUP table for Language Cd. See definition of Language Cd field. The language code that this particular provider is fluent in. For example, 1. AS - American Sign Language 2. CA - Cantonese 3. EN - English 4. IT - Italian 5. SP - Spanish etc. | No | Yes | No |
| PROVIDER SPECIALTY | This table identifies all specialties practiced by this this provider. | Prove Spec Key | Uniquely identifies a specialty code to provider. | Yes | Yes | No |
| | | Provider Key | An internal unique provider identifier. | No | Yes | Yes |
| | | Specialty Cd Lookup Key | Contains the appropriate Lookup Key in LOOKUP table for Specialty Cd. See definition of Specialty Cd field. An industry set of specialties that can be practiced by a provider. | No | Yes | No |
| | | Credential Flg | Future . . . A 'Y'es or 'N'o flag indicating that this specialty requires Credentialing or not. | No | No | No |
| | | PCP Allowed Flg | Future . . . A 'Y'es or 'N'o indicator identifying whether the specialty allows for PCP designation. | No | No | No |
| PROVIDER STAFF | This table contains all staff members to a particular provider who requires access to the system via the account setup process. | Provider Key | An internal unique provider identifier. | No | Yes | Yes |
| | | Admin Role | This identifies the particular role that allows a Provider to control what security levels to access what part of the database. | No | Yes | No |

-continued

| Entity Name | Entity Description | Attribute Name | Attribute Description | PK | Req | FK |
|---|---|---|---|---|---|---|
| | | Acct Key | This is unique Key based on Username. | No | No | Yes |
| | | First Name | First name of this Provider group user. | No | No | No |
| | | Last Name | Last Name of Provider group user. | No | No | No |
| | | SSN | Social security number to uniquely identify the user. | No | No | No |
| SITE SPECIALTY | An intersection table to show a provider's specialties that is practice at a particular site. | Site Specialty Key | A unique identifier based on all of a provider's specialties at this site. | Yes | Yes | No |
| | | Practice Site Key | This key uniquely identifies a practice site for a provider. This practice details the MCO product that is provided by this doctor. | No | Yes | Yes |
| | | Prov Spec Key | Uniquely identifies a specialty code to this provider. | No | Yes | Yes |
| STAGING AREA | This table tracks the process of a member through the system for various transaction events; i.e. Enrollment; Profile Change; etc. | Tran Key | This is unique identifier for this particular Staging Area record. | Yes | Yes | No |
| | | Birthdate | Birthdate of this effected member. | No | Yes | No |
| | | Tran Id | This transaction id groups multiple transaction records into a single processing unit. For example, in the enrollment process, the primary subscriber may have 3 dependents. Therefore, the same Tran Id of the 3 dependents is the same as the Tran Key and Tran Id of the subscriber Staging Area table. | No | Yes | No |
| | | Tran Stage Num | This identifies a stage to the transaction process of the member of an employer group. For example, the various states for new enrollment transaction type (ENNW) are: "01 = new enrollment submitted by member" "02 = enrollment approved by employer" "03 = enrollment sent successfully to MCO" "06 = enrollment denied by employer" "07 = enrollment failed in delivery to MCO" "08 = enrollment denial exceeds 30 days from initial creation date" | No | Yes | No |

-continued

| Entity Name | Entity Description | Attribute Name | Attribute Description | PK | Req | FK |
|---|---|---|---|---|---|---|
| | | Tran Start Date | This is the start date/time of transaction process. | No | Yes | No |
| | | Tran Status | The status of this transaction request. | No | Yes | No |
| | | Tran Type | This defines what type of transaction is staged; i.e. enrollment, address change, etc. | No | Yes | No |
| | | Employer Key | Unique lookup key that identifies this employer coverage based on a contract number with a MCO. | No | No | Yes |
| | | MCO Key | Unique managed care identifier key. | No | No | Yes |
| | | Member Key | This identifies a unique Member; currently based on Social Security Number and Date-Of-Birth. | No | No | Yes |
| | | Practice Site Key | This key uniquely identifies a practice site for a provider. This practice details the MCO product that is provided by this doctor. | No | No | Yes |
| | | Address1 | Address Line 1 - i.e. 111 Main Street | No | No | No |
| | | Address2 | Address Line 2 - i.e. P.O. Box; Suite Number; etc. | No | No | No |
| | | AMI Division Num | A Division Number for MCO plan in AMISYS. This field and/or AMI Group Number will point to a generic Sub Group Id. | No | No | No |
| | | AMI DOD | Amisys required Date of Death. | No | No | No |
| | | AMI Facility Cd | Amisys specific for HPHC Facility Code. | No | No | No |
| | | AMI Group Num | A Group Number for its MCO plan in AMISYS. This field and/or AMI Division Number will point to a generic Sub Group Id. | No | No | No |
| | | AMI PCP City | Amisys requested city of selected PCP. | No | No | No |
| | | AMI PCP Id | Amisys specific - Provider Id. | No | No | No |
| | | AMI Termdate | Amisys specific Termination date of subscriber/member. | No | No | No |
| | | AMISYS Reject Cd | This field will store the AMISYS rejection code; if this member's record is rejected by the AMISYS system | No | No | No |
| | | City | The city name of the effected member's address. | No | No | No |
| | | COB Birthdate | The birthday of the subscriber to this Coordination of Benefits policy. | No | No | No |
| | | COB Carrier Name | The carrier insurance company name for this coordination of benefits. | No | No | No |

-continued

| Entity Name | Entity Description | Attribute Name | Attribute Description | PK | Req | FK |
|---|---|---|---|---|---|---|
| | | COB Coverage Type | The coverage type of this policy number of the subscriber to this Coordination of Benefits policy. | No | No | No |
| | | COB Effective Date | The effective date of this policy number of the subscriber to this Coordination of Benefits policy. | No | No | No |
| | | COB First Name | The first name of the subscriber to this Coordination of Benefits policy. | No | No | No |
| | | COB Last Name | The last name of the subscriber to this Coordination of Benefits policy. | No | No | No |
| | | COB Policy Num | The policy number of the subscriber to this Coordination of Benefits policy. | No | No | No |
| | | Country | US postal country code of the effected member's address. | No | No | No |
| | | County | The county name of the effected member's address. | No | No | No |
| | | Coverage Type | This field details the coverage type selected by the subscriber member: 1. individual 2. Family 3. 2Person . . . etc. | No | No | No |
| | | Coverage Type Lookup Key | The parameters to LOOKUP table will be based on the type of healthcare coverage that the member is subscribing to: 1. I = Individual, 2. F = Family, 3. etc. Note that the various Coverage Types are different; depending on the Tier Type (in EMPLOYER_PLAN table) that is associated with Plan/Contract/Sub Group Id. | No | No | No |
| | | Effective Date | The effective start date of this transaction; i.e. Enrollment date is future-dated. Enrollment process takes place usually 30-60 days before the actual start date. | No | No | No |
| | | Email Address | Email address of member. | No | No | No |
| | | Employer Plan Id | This is the employer plan id; it should uniquely identify the Employer to a Contract Id for a certain SubGroup (Group/Division) that it expect healthcare coverage from a MCO. | No | No | No |
| | | Existing Patient Flg | A 'Y'es or 'No'o flag to indicate whether the member is an | No | No | No |

| Entity Name | Entity Description | Attribute Name | Attribute Description | PK | Req | FK |
|---|---|---|---|---|---|---|
| | | | existing patient of the selected PCP. | | | |
| | | First Name | First name of the effected member of this transaction. | No | No | No |
| | | Gender | This is a single character column; note that this is an optional field: 1. M = Male 2. F = Female | No | No | No |
| | | Graduation Date | Expected graduation date of member from school. | No | No | No |
| | | Hiredate | The hiring date of the subscriber member to the Employer group. | No | No | No |
| | | Home Phone Num | Long hand representation of member's home phone number. For example, 800.555.1212 | No | No | No |
| | | Language Cd | The language code that is preferred by this member. For example, 1. AS - American Sign Language 2. CA - Cantonese 3. EN - English 4. IT - Italian 5. Sp - Spanish . . . etc. | No | No | No |
| | | Language Cd Lookup Key | Contains the appropriate Lookup Key in LOOKUP table for Language Cd. See definition of Language Cd field. | No | No | No |
| | | Last Name | Last name of the effected member of this transaction. | No | No | No |
| | | Middle Name | Middle name of the effected member of this transaction. | No | No | No |
| | | Nickname | A nickname to the member's first name. | No | No | No |
| | | Plan Cd | This is the plan code or name that is offered by the MCO. | No | No | No |
| | | Plan LookupKey | Cd Contains the appropriate Lookup Key in LOOKUP table for Plan Cd. See definition of Plan Cd field. | No | No | No |
| | | Prefix | A prefix to the member's name; i.e. Dr, Mr, Ms, etc. | No | No | No |
| | | Relation Cd | This field indicates the relationship of member to the primary subscriber of plan. Current Relation Code recognized by HPHC are: 01 = Self 02 = Spouse 03 = Unmarried child under 19 04 = Unmarried stepchild under 19 05 = Unmarried fulltime student over 19 06 = Handicapped 07 = Ex-Spouse | No | No | No |

-continued

| Entity Name | Entity Description | Attribute Name | Attribute Description | PK | Req | FK |
|---|---|---|---|---|---|---|
| | | School City | City code of school that this full time student over 19 is attending. | No | No | No |
| | | School Name | Name of school that this full time student over 19 is attending. | No | No | No |
| | | School State | State code of school that this full time student over 19 is attending. | No | No | No |
| | | School ZIP | Postal zipcode of school. | No | No | No |
| | | School ZIP Plus4 | Long postal zipcode of school. | No | No | No |
| | | Selected PCP | Selected PCP for this member; this can be as simple as the provider number. | No | No | No |
| | | Semester End Date | End date of school semester of member. | No | No | No |
| | | Semester Start Date | Start date of school semester for member. | No | No | No |
| | | SSN | Social Security number of this member. | No | No | No |
| | | State | US postal state code of the effected member's address. | No | No | No |
| | | Student 19 Flg | This flag condition, 'Y'es or 'N'o, indicates whether the member information reflects that of a fulltime student over 19 and under the maximum student age (according to HPHC standard). | No | No | No |
| | | Sub Group Id | This is the Employer group number that is known to the MCO. For example, a company may have a union and nonunion subgroups. | No | No | No |
| | | Suffix | A suffix to the member's name; i.e. ESQ, II, etc. | No | No | No |
| | | Tran End Date | This is the start date/time of transaction process. | No | No | No |
| | | Work Phone Num | User can place a Work phone number in this field | No | No | No |
| | | ZIP | US postal zip code of the effected member's address. | No | No | No |
| | | ZIP Plus4 | Longer version of US postal zip code of the effected member's address. | No | No | No |
| STAGING AUDIT | This is an Audit Log for a specific record; it will log the WHO and WHEN and WHY a "Tran Stage Num" is reached within the Staging Area record. | Tran Key | This is unique identifier for this particular Staging Area record. | No | Yes | Yes |
| | | Modified By | The identity of the person updating a Staging transaction record to the new | No | Yes | No |

-continued

| Entity Name | Entity Description | Attribute Name | Attribute Description | PK | Req | FK |
|---|---|---|---|---|---|---|
| | | | Stage Num; i.e. login user name. | | | |
| | | Modified Date | The date/tamestamp to when an update to the Staging transaction record to the new Stage Num. | No | Yes | No |
| | | Tran Stage Num | This identifies a stage to the transaction process of the member of an employer group. Initial release supports: 1. Waiting For Employer Approval 2.successful to Connector Queue. Later releases should support the various stages that enrollment can be; i.e. all information except the PCP is inputted at one time. | No | Yes | No |
| | | Comment | This field can capture any description that is attributed to a change to the stage of an enrollment. For example, the comments tied to a rejection of employee validation its employer. | No | No | No |
| STAGING DIGITAL ADDR | This table will contain other digital addresses that is related to this particular Staging Area record. For example, the STAGING AREA record contains a home, work, and email address for the primary HOME physical address. This table will allow for additional ones like: Cell, Pager, etc.; or different combinations like a Vacation Home phone number. | Tran Key | This is unique identifier for this particular Staging Area record. | No | Yes | Yes |
| | | Purpose Cd | This identifies the purpose of this address; such as: "1. PR = Practice Address" "2. HM = Home Address" "3. BL = Billing Address" "4. ML = Mailing Address" "5. WK = Work Address" | No | Yes | No |
| | | Type Cd | This code defined the various types: "1. VC = Voice/Land phone" "2. CL = Cell phone" "3. PG = Pager" "4. EM = Email" "5. WB = Web Home Page" | No | Yes | No |
| | | Value1 | Contains initial value associated with a type of digital address. For example | No | Yes | No |

-continued

| Entity Name | Entity Description | Attribute Name | Attribute Description | PK | Req | FK |
|---|---|---|---|---|---|---|
| | | | - voice mail includes: 800.555.1212 or abc@foobar.com for Email type. | | | |
| | | Value2 | This may be a second value set to a specific type of digital address. For example - voice mail may include an extension part to the original phone number. | No | No | No |
| | | Value3 | This third value association is for obscure elements like answer back string to a modem connect and/or future electronic requirements. | No | No | No |
| STAGING PHYSICAL ADDR | This table will contain other physical addresses that is related to this particular Staging Area record. For example, beside the primary Home address in the STAGING AREA record; this member may want to designate other types like: Work, Vacation, Practice, etc. | Tran Key | This is unique identifier for this particular Staging Area record. | No | Yes | Yes |
| | | Address1 | Address line 1 containing the typical information of: 123 Main Street | No | Yes | No |
| | | City | City name of physical address, | No | Yes | No |
| | | Country | A recognized Postal Country Code. | No | Yes | No |
| | | County | County name of physical address. | No | Yes | No |
| | | Purpose Cd | This identifies the purpose of this address; such as: "1. PR = Practice Address" "2. HM = Home Address" "3. BL = Billing Address" "4. ML = Mailing Address" "5. WK = Work Address" | No | Yes | No |
| | | State | State where physical address is based. | No | Yes | No |
| | | ZIP | US based postal zip code. | No | Yes | No |
| | | Address2 | Address line 2 containing typical information regarding: P.O. Box; Suite#; Apt#; etc. | No | No | No |
| | | ZIP Plus4 | The longer version of US-based postal zip code. | No | No | No |

One of ordinary skill in the art will appreciate that the account structure described above and illustrated in FIGS. 13A-13C enables administrative transactions to be moved across health plans. Thus, as a user moves from one job to another, his or her member history can be taken along. As described above, the account provides a complete member history that is persistent across plan changes, employment changes, family history changes, and the like.

The administrative account allows members the opportunity to review and manage the many aspects of their personal care through a web browser. The account includes a record of the member's healthcare benefits throughout their life. Once enrolled, what was previously disparate data is now meaningful, actionable information. The system allows the user (member/patient/employee) to access their personal healthcare administrative record (e.g., personal profile, out-of-pocket expenses, utilization, etc.) and to use that information to increase their control over their healthcare experience. The account is portable, meaning that it will support a member's move to other employers or other health plans.

The account permits the member to view and update demographic information, insurance elections and medical information. The end user can create an online medical history for themselves and their dependents. The record can then be used to create health history reports for their physicians, schools and other institutions. As described above, the messaging module enables secure Web-based messaging among patients, providers, employers, and the MCO.

The present invention provides significant advantages. For the managed care organization, the enrollment data entry function is offloaded to members, which leads to quicker data entry and faster turnaround. The invention provides more accurate data due to online data entry by a member in a single place. Validation on data entry leads to fewer manual interventions, and lower cost per transaction due to reduced FTEs and reduced equipment costs. The invention provides for greater member loyalty due to ease of member enrollment and re-enrollment. For the member, the invention makes it easier and faster to re-enroll because data has been previously entered. The invention provides the member a greater degree of ownership as the data can be updated as often as necessary, and it provides a faster turnaround time due to elimination of paper. For the employer, there is less burden of processing paper-based forms. More accurate data is provided, and such data is always available via audit trails, activity reports and roster reports. Employers have lower costs per transaction as the system processes the transaction, not the employer. The invention provides the employers ease of administration when dealing with multiple MCOs. For the healthcare provider, the invention ensures more accurate and up-to-date data, because the member can view and update the data as necessary.

The invention is implemented in a server-side piece of code, as has been described. More generally, the inventive functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As noted above, a given workstation and a server may communicate over the public Internet, an intranet, or any other computer network. If desired, given communications may take place over a secure connection. Thus, for example, a client may communicate with the server using a network security protocol, such as Netscape's Secure Socket Layer (SSL) protocol or the like.

A representative client is a personal computer, notebook computer, Internet appliance or pervasive computing device (e.g., a PDA or palm computer) that is Pentium-, PowerPC®- or RISC-based. The client includes an operating system, such as Microsoft Windows, Linux, Unix, Microsoft Windows CE, BeOS, PalmOS, and a login program. A representative server comprises a RISC- or Pentium-based processor, an operating system (e.g., NT, Unix, WebSphere, Linux, Apache, or the like) and, as needed, a trusted third party authentication service.

Having thus described our invention, what we claim as new and desire to secure by Letters Patent is set forth in the following claims.

The invention claimed is:

1. A computer system for use in a web-based managed care transaction system, the computer system comprising:
   a memory; and
   a set of linked data tables organized into a logical entity in the memory;
   wherein the set of linked data tables includes for each member:
      a master account table including account setup information for at least one of utilization and login actions for said web-based managed care transaction system;
      a member table including identity information for at least one member and their dependents; and
      a set of one or more member history tables associated with the member table, each member history table associated with a given employer plan, wherein said logical entity is persistent over changes to each member's changes within said employer plan;
   a plurality of linked tables representing a plurality of health providers, the plurality of tables including for each health provider in the plurality of health providers:
      a provider information table including identity information for the health provider;
      a provider specialty table identifying specialties practiced by the health provider;
      a site specialty table identifying specialties practiced by the healthcare provider at one or more sites;
      a hospital affiliation table identifying one or more hospitals affiliated with the health provider; and
      a provider affiliation table linked to the provider information table and said employer plan, the provider information table providing an intersection of the specialties in the provider specialty table and specialties allowed by said employer plan;
   wherein, for at least a given health provider from the plurality of health providers, the web-based managed care transaction system provides each member access to identity information for the given health provider, specialties practiced by the given health provider, specialties practiced by the healthcare provider at one or more sites, information related to one or more hospitals affiliated with the given health provider, and any specialties allowed by said employer plan;
   wherein the web-based managed care transaction system is adapted to enable, via the linked set of data tables, an administrative account to be moved across health plans of the at least one member and their dependents throughout their life;
   wherein the web-based managed care transaction system is adapted to allow the at least one member to review, manage, and update the administrative account via a web browser, the administrative account comprising a history of health plans including past and present health plans of the at least one member and their dependents;

wherein the administrative account is owned by the at least one member;

wherein the web-based managed care transaction system provides a personal healthcare network for each member, the personal healthcare network comprising the member, at least one employer, and at least one health provider;

wherein the personal healthcare network facilitates secure communication of healthcare-related information therethrough; and wherein the web-based managed care transaction system limits communication of the member's healthcare-related information to selected parties of the personal healthcare network of the member.

2. The computer system as described in claim 1 wherein the set of data tables includes an employer table having associated therewith a set of one or more employer plan tables.

3. The computer system as described in claim 2 wherein a given employer plan table identifies a given employer plan.

4. The computer system as described in claim 2 further including a managed care organization (MCO) table having associated therewith a set of one or more MCO product plan tables.

5. The computer system as described in claim 4 wherein a given MCO product plan table has associated therewith the set of one or more employer plan tables.

6. The computer system as described in claim 1 wherein a given member history table has associated therewith a set of one or more coordinated benefits tables.

7. The computer system as described in claim 1 wherein a given member history table has associated therewith a set of one or more assigned primary care physician (PCP) tables.

8. The computer system as described in claim 7 wherein an assigned PCP table has associated therewith a given provider affiliation table.

9. The computer system as described in claim 1 wherein the provider information table includes a set of one or more provider staff tables.

10. The computer system as described in claim 1 wherein the set of data tables includes a staging area table that includes data which tracks the member through various transaction events.

11. A web-based managed care transaction system accessible over a computer network using a client browser, comprising:
   a transaction server;
   a database for storing a set of linked data tables organized into a persistent logical entity wherein said logical entity maintains data on each member in spite of status changes;
   wherein the set of linked data tables includes for each member:
      a master account table including account setup information for at least one of utilization and login actions for said web-based managed care transaction system;
      a member table including identity information for at least one member and their dependents; and
      a set of one or more member history tables associated with the member table, each member history table associated with a given employer plan;
   a plurality of linked tables representing a plurality of health providers, the plurality of tables including for each health provider in the plurality of health providers:
      a provider information table including identity information for the health provider;
      a provider specialty table identifying specialties practiced by the health provider;
      a site specialty table identifying specialties practiced by the healthcare provider at one or more sites;
      a hospital affiliation table identifying one or more hospitals affiliated with the health provider; and
      a provider affiliation table linked to the provider information table and said employer plan, the provider information table providing an intersection of the specialties in the provider specialty table and specialties allowed by said employer plan;

wherein the web-based managed care transaction system is adapted to enable, via the linked set of data tables, an administrative account to be moved across health plans of the at least one member and their dependents throughout their life;

wherein the web-based managed care transaction system is adapted to allow the at least one member to review, manage, and update the administrative account via the client browser, the administrative account comprising a history of health plans including past and present health plans of the at least one member and their dependents;

wherein the administrative account is owned by the at least one member;

wherein the web-based managed care transaction system provides a personal healthcare network for each member, the personal healthcare network comprising the member, at least one employer, and at least one health provider;

wherein the personal healthcare network facilitates secure communication of healthcare-related information therethrough; and wherein the web-based managed care transaction system limits communication of the member's healthcare-related information to selected parties of the personal healthcare network of the member.

12. A network-based managed care system comprising a network based server;
   at least one client machine on which a graphical user interface operates;
   a network based subsystem comprising:
      a multiplexer;
      a plurality of functional modules;
      a transaction processor; and
      a database wherein a logical entity retains data representative of users received healthcare within said database persistent across changes to a user's healthcare plan
   wherein the database includes:
      a master account table for retaining account setup information for at least one of utilization and login actions for said network-based managed care system; and
      a member table including identity information for at least one member and their dependents;
      a plurality of linked tables representing a plurality of health providers, the plurality of tables including for each health provider in the plurality of health providers:
         a provider information table including identity information for the health provider;
         a provider specialty table identifying specialties practiced by the health provider;
         a site specialty table identifying specialties practiced by the healthcare provider at one or more sites;
         a hospital affiliation table identifying one or more hospitals affiliated with the health provider; and
         a provider affiliation table linked to the provider information table and said employer plan, the provider information table providing an intersection of the specialties in the provider specialty table and specialties allowed by said employer plan;

a managed care organization (MCO) subsystem interfaced to said transaction processor;

wherein the network-based managed care system is adapted to enable, via the database, an administrative account to be moved across health plans of the at least one member and their dependents throughout their life;

wherein the administrative account comprises a history of health plans including past and present health plans of the at least one member and their dependents;

wherein the administrative account is owned by the at least one member; and wherein the network-based managed care transaction system provides a personal healthcare network for each member, the personal healthcare network comprising the member, at least one employer, and at least one health provider;

wherein the personal healthcare network facilitates secure communication of healthcare-related information therethrough; and wherein the network-based managed care system limits communication of the member's healthcare-related information to selected parties of the personal healthcare network of the member.

13. The network-based managed care system of claim 12 wherein said functional modules comprise:
   an enrollment module;
   billing module;
   messaging module; and
   inquiry module.

14. The network-based managed care system of claim 12, wherein changes to a user's health plan occur as a user changes employment.

15. The network-based managed care system of claim 12, wherein changes to a user's health plan occur as a user changes their healthcare plan.

16. The network-based managed care system of claim 12 wherein the network comprises an Internet.

17. The network-based care system of claim 12 wherein said database contains a historical record of care provided to said user.

18. The network-based managed care system of claim 12 wherein said persistent logical entity comprises the administrative account.

19. The network-based managed care system of claim 18 wherein said persistent logical entity spans a user's change in employment plans.

* * * * *